(12) United States Patent
Morton et al.

(10) Patent No.: US 11,776,578 B2
(45) Date of Patent: Oct. 3, 2023

(54) AUTOMATIC MODIFICATION OF VALUES OF CONTENT ELEMENTS IN A VIDEO

(71) Applicant: Trapelo Corp., Boston, MA (US)

(72) Inventors: Kyle Douglas Morton, Waltham, MA (US); David B. Bernstein, Newton, MA (US); William Morse, Lowell, MA (US); James Reetzke, Watertown, MA (US); Nick Leoutsakos, Boston, MA (US); David Mullins, Boston, MA (US); Andrew McLellan, Medford, MA (US)

(73) Assignee: Trapelo Corp., Belmont, MA (US)

( * ) Notice: Subject to any disclaimer, the term of this patent is extended or adjusted under 35 U.S.C. 154(b) by 0 days.

(21) Appl. No.: 17/073,046

(22) Filed: Oct. 16, 2020

(65) Prior Publication Data

US 2021/0375324 A1    Dec. 2, 2021

Related U.S. Application Data

(60) Provisional application No. 63/033,662, filed on Jun. 2, 2020.

(51) Int. Cl.
*G11B 27/036* (2006.01)
*G06F 40/263* (2020.01)
(Continued)

(52) U.S. Cl.
CPC .......... *G11B 27/036* (2013.01); *G06F 40/263* (2020.01); *G06F 40/58* (2020.01); *G06V 20/46* (2022.01); *H04N 9/8715* (2013.01)

(58) Field of Classification Search
USPC ................... 386/239–248, 278–290
See application file for complete search history.

(56) References Cited

U.S. PATENT DOCUMENTS 7,831,423 B2    11/2010 Schubert
8,296,389 B2    10/2012 Maegawa et al.
(Continued)

OTHER PUBLICATIONS

Wikipedia.org[online], "Optical Character Recognition" available on or before Oct. 20. 2010. via Internet Archive: Wayback Machine URL <https://web.archive.org/web/20101020210227/http://en.wikipedia.org/wiki/Optical_character_recognition>, retrieved on Oct. 22, 2020, URL<https://en.wikipedia.org/wiki/Optical_character_recognition>, 5 pages.

(Continued)

*Primary Examiner* — Hung Q Dang
(74) *Attorney, Agent, or Firm* — Fish & Richardson P.C.

(57) ABSTRACT

The present disclosure involves systems, software, and computer implemented methods for automatically modifying values of content elements in frames of a video. One example method includes obtaining an input video. A set of elements included in one or more frames of the input video is identified. Metadata is generated for each element in the set of elements. A determination is made that a value for a particular element in the set of elements is targeted for replacement. A replacement value is determined for the particular element and updated metadata is generated. A metadata entry for the particular element is updated to include the determined replacement value. Output content is generated based on the updated metadata the output content is provided for display.

22 Claims, 17 Drawing Sheets

(51) Int. Cl.
| | |
|---|---|
| *G06F 40/58* | (2020.01) |
| *G06V 20/40* | (2022.01) |
| *H04N 9/87* | (2006.01) |
| *G06F 40/40* | (2020.01) |
| *G11B 27/031* | (2006.01) |
| *H04N 5/76* | (2006.01) |
| *H04N 9/82* | (2006.01) |

(56) References Cited

U.S. PATENT DOCUMENTS

| | | | |
|---|---|---|---|
| 9,754,166 B2 | 9/2017 | Ludwigsen et al. | |
| 2003/0093790 A1 | 5/2003 | Logan et al. | |
| 2007/0038612 A1 | 2/2007 | Sull et al. | |
| 2012/0316860 A1 | 12/2012 | Reitan | |
| 2014/0201631 A1* | 7/2014 | Pornprasitsakul | G11B 27/031 715/716 |
| 2014/0280272 A1* | 9/2014 | Choque | G06F 16/40 707/758 |
| 2015/0172563 A1* | 6/2015 | Jakobson | H04N 21/8541 386/250 |
| 2016/0028968 A1 | 1/2016 | Affaticati | |
| 2016/0247423 A1* | 8/2016 | Hohl | H04N 21/812 |
| 2016/0379410 A1* | 12/2016 | Sharma | H04N 21/4316 345/633 |
| 2017/0180795 A1 | 6/2017 | Cremer et al. | |

OTHER PUBLICATIONS

Wikipedia.org[online], "Outline of Object Recognition" available on or before Apr. 18, 2012, via Internet Archive: Wayback Machine URL <https://web.archive.org/web/20120418033210/http://en.wikipedia.org/wiki/Outline_of_object_recognition>, retrieved on Oct. 22, 2020, URL<https://en.wikipedia.org/wiki/Outline_of_object_recognition>, 6 pages.

Wikipedia.org[online], "Machine Translation" available on or before Jun. 26, 2004, via Internet Archive: Wayback Machine URL <https://web.archive.org/web/20040626110654/http://en.wikipedia.org/wiki/Machine_translation>, retrieved on Oct. 22, 2020, URL<https://en.wikipedia.org/wiki/Machine_translation>, 3 pages.

Wikipedia.org[online], "Adobe After Effects" available on or before Feb. 15, 2005, via Internet Archive: Wayback Machine URL <http://web.archive.org/web/20050215103026/http://en.wikipedia.org/wiki/Adobe_After_Effects>, retrieved on Oct. 22, 2020, URL<https://en.wikipedia.org/wiki/Adobe_After_Effects>, 1 page.

Wikipedia.org[online], "Web Hypertext Application Technology Working Group" available on or before Mar. 10, 2007, via Internet Archive: Wayback Machine URL <hhttp://web.archive.org/web/20070310130948/http://en.wikipedia.org/wiki/HTML5>, retrieved on Oct. 22, 2020, URL<https://en.wikipedia.org/wiki/HTML5>, 2 pages.

International Preliminary Report on Patentability in International Appln. No. PCT/US2021/035427, dated Dec. 15, 2022, 11 pages.

International Search Report and Written Opinion in International Appln. No. PCT/US21/35427, dated Sep. 8, 2021, 12 pages.

\* cited by examiner

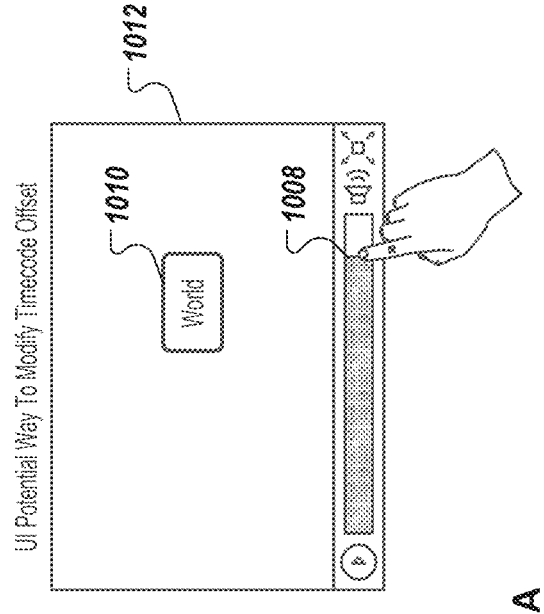
FIG. 10A
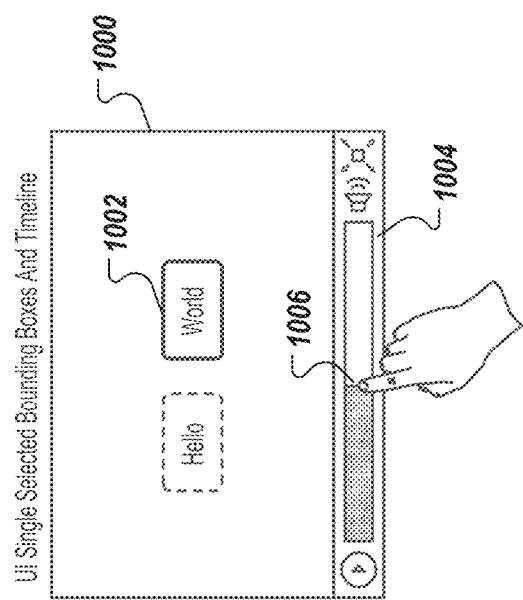
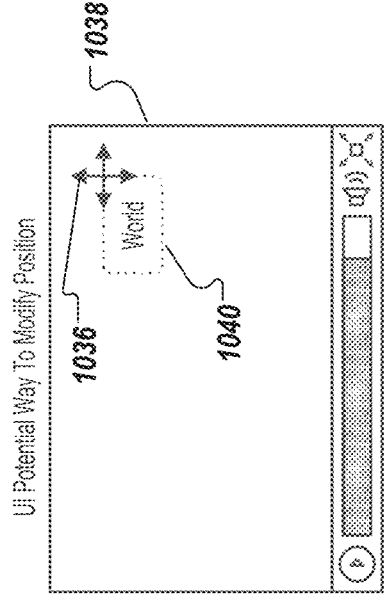
FIG. 10B
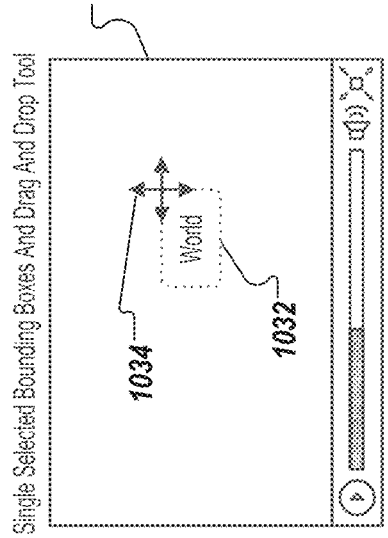

AUTOMATIC MODIFICATION OF VALUES OF CONTENT ELEMENTS IN A VIDEO

CROSS-REFERENCE TO RELATED APPLICATION

This application claims the benefit of U.S. Application Ser. No. 63/033,662 filed on Jun. 2, 2020, the entire contents of which are incorporated by reference in its entirety.

TECHNICAL FIELD

The present disclosure relates to computer-implemented methods, software, and systems for automatically modifying values of content elements in frames of a video.

BACKGROUND

Video content can be provided in various formats. For instance, video content can be provided as a video file. As another example, video content can be provided as real-time streaming data. A video player can be used to play video content. A video player can support playback of one or both of video files or video streams.

SUMMARY

The present disclosure involves systems, software, and computer-implemented methods for automatically modifying values of content elements in frames of a video. An example method can include: obtaining an input video; identifying a set of elements included in one or more frames of the input video; generating metadata for each element in the set of elements; determining that a value for a particular element in the set of elements is targeted for replacement; determining a replacement value for the particular element; generating updated metadata, including updating a metadata entry for the particular element to include the determined replacement value; generating output content based on the updated metadata; and providing the output content for display.

These and other implementations can each optionally include one or more of the following features. The identified set of elements can include one or more of text elements, object elements, or spoken utterances. Determining that the value for the particular element that is targeted for replacement can include receiving a request to translate the input video into a target language that is different from a source language of the particular element. The request to translate the input video can identify the source language of the particular element or the source language of the input video can be determined. Determining the replacement value for the particular element can include translating a text value of the particular element into the target language. Updating the metadata entry for the particular element can include adding translated text values to the corresponding metadata entry for the particular element. Generating the output content based on the updated metadata can include creating a new video asset that includes the determined replacement value. Providing the output content for display can include rendering a replacement value as overlay content superimposed over the value of the particular element as one or more frames of the input video that include the particular element are being presented during playback of the input video. The identified set of elements can include text elements and object elements and generating metadata for each element in the set of elements can include generating, for each element in the set of elements, a token value, frame information, time offset information, and positional information. Generating updated metadata can include splitting a single metadata entry into multiple metadata entries or combining multiple metadata entries into a single metadata entry. Generating updated metadata can include: presenting visual representations of the identified elements in a user interface; enabling the user to interact with the visual representations; and updating the metadata in response to user interactions with the visual representations. Generating updated metadata can include modifying metadata entries to include rendering code for use in rendering the replacement value as overlay content over the value of the particular element. Determining that the particular element is targeted for replacement can include determining that the particular element is included in a dictionary that maps original values to replacement values. Determining the replacement value for the particular element can include querying the dictionary to obtain the replacement value.

While generally described as computer-implemented software embodied on tangible media that processes and transforms the respective data, some or all of the aspects described in this specification may be computer-implemented methods or may further be included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 9A, 9B, 10A, and 10B illustrate example user interfaces that provide various user controls for interacting with bounding boxes to affect changes in corresponding metadata entries.

DETAILED DESCRIPTION

Figure 1:
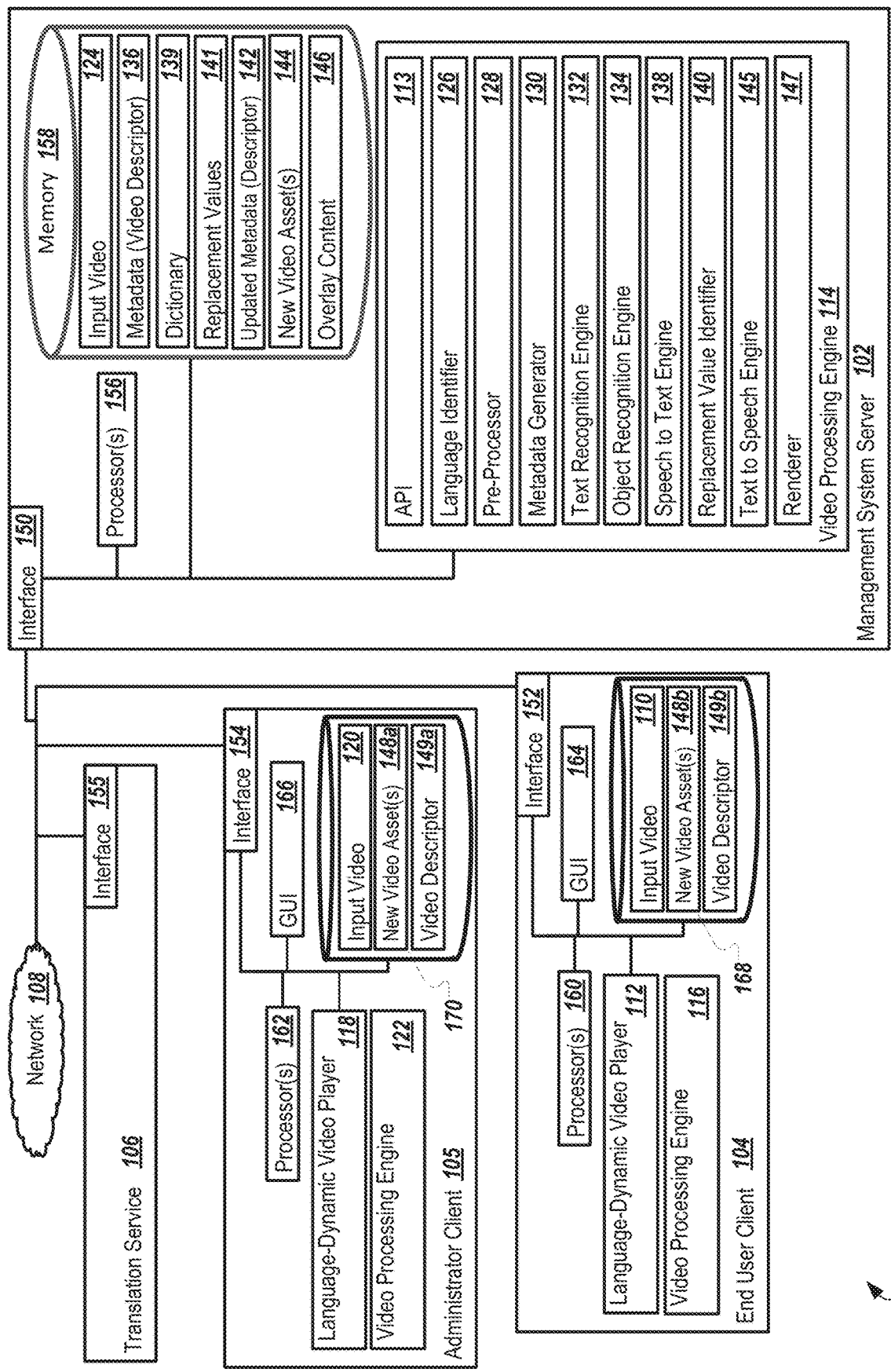
FIG. 1 is a block diagram illustrating an example system for automatically modifying values of content elements of a video.

Videos generally include content elements (e.g., text) in a particular language (which is also referred to as a source language). In order to provide the one or more of the content elements of the video in a target language (i.e., a language other than the source language), a video generally has to be recreated in the target language. However, video recreation can be resource intensive (which in turn can be costly) and time consuming, and time and resource consumption/cost concerns can result in a video creator choosing to not create a video in multiple languages, to the detriment of viewers who speak/understand languages other than the language used in the original production.

As another example, other problems can exist for video content that contains legal disclaimers or text related to regulatory compliance. When modifications to such text are required by law or governance or institutional practice, a time consuming and resource intensive/costly process may be undertaken to re-encode the video with the modifications and to re-distribute the modified content. Lack of adherence to the modification process may expose the video owner to legal or regulatory repercussions.

Further problems can exist for video content in which logos, images, pricing information, hyperlinks, phone numbers, physical addresses, or similar information becomes out of date, or for which a other rationale(s) exists for modification. Such modifications, if done manually, can be time consuming, resource intensive, and costly. A failure to make recommended modifications can cause compliance or other contractual or legal issues with customers or partners.

To solve these and other problems, a system described herein can be used to create and present language-dynamic video content, which can include displaying, in near real time, translated text (in a target language) (or other replacement text) in the place of original text (in a source language, which is different from the target language) within the visuals of a video (which can include image frames ordered in a sequence). Use of the automated approach described herein can avoid a manual process of video recreation. The automated approach can be performed using less computing resources than a manual process. For example, the automated approach can leverage efficiencies when creating multiple outputs in multiple target languages, since generated metadata can be reused. Other advantages can include a reduction in production time as compared to manual efforts. Additionally, the automated approach can produce more consistent, repeatable results, from automated algorithmic processes, than manual approaches which may produce inconsistent results based on which human operators are performing the manual process.

Based on an input video, the system described herein can automatically extract metadata describing/regarding (or otherwise representing) text and object elements from frames of the input video. For example, text and objects can be recognized using optical character recognition or other text recognition or image processing technologies. Metadata describing/regarding (or otherwise representing) the detected text or object (each individually referred to as an element) can be produced and each extracted element can be assigned a unique token value (and thus, can also be referred to as a tokenized element). Tokenization of the detected elements can enable the elements to be programmatically referenced in later stages of the processes described herein.

Various mechanisms can be used for determining and specifying replacement values for each tokenized element. Replacement values can be superimposed over original values to generate output content. For example, translated text can be superimposed at an approximate visual position of the detected original text, at the proper frame or related video offset timecode, and in a visual style that matches the detected text. Displaying of replacement values can give an impression to a user that a new video is being presented, for example. In addition or alternatively to displaying replacement values, other types of output content can be presented, such as metadata and updated closed captioning.

These and additional features are described in greater detail throughout this specification.

FIG. 1 is a block diagram illustrating an example system for automatically modifying values of content elements of a video. Specifically, the illustrated system 100 includes or is communicably coupled with a management system server 102, an end-user client device 104, an administrator client device 105, a translation service 106, and a network 108. Although shown separately, in some implementations, functionality of two or more systems or servers may be provided by a single system or server. In some implementations, the functionality of one illustrated system, server, or engine may be provided by multiple systems, servers, or engines, respectively. As used in this specification, the term engine refers to a data processing apparatus that performs a set of tasks.

An end user of the end-user client device 104 may desire to generate output content based on an input video 110. For example, the user may desire to view a translated version of the input video 110 or would otherwise like to have certain items replaced in the input video 110. As another example, the user may desire to obtain metadata about items (e.g., text items, objects, spoken words) in the input video 110.

The end-user client device 104 can submit a request to obtain output content for the input video 110 to the management system server 102. For example, a language-dynamic video player 112 (or another type of video player or application, such as a web browser) on the end user client device 104 may submit a request to the management system server 102, using an API (Application Programming Interface) 113, to obtain output content for the input video 110. Although shown as residing on the end-user client device 104, the input video 110 may reside on another system, such as a video hosting system, or may reside at the management system server 102. The request to obtain output content for the input video 110 may include the input video 110 or may include a link or reference to the input video 110.

The management system server 102 includes a video processing engine 114 that can receive and process the request to generate output content for the input video 110. The video processing engine 114 and its various sub-engines are described in more detail below. The video processing engine 114 can be implemented as a server process in the management system server 102 that is configured to listen to requests. The video processing engine 114 can be configured to route requests to various sub-engines or some or all sub-engines of the video processing engine 114 can be independent and can be configured to receive external requests. As another example, the end-user client device 104 may include a local video processing engine 116 that includes some or all of the functionality of the video processing engine 114. That is, the end-user client device 104 can serve as a standalone system which does not rely on the management system server 102 (except perhaps to initially receive the local video processing engine 116). The local video processing engine 116 can be a library or an application that is provided by the management system server 102 to the end-user client device 104.

As yet another example, an administrative user can use the administrator client device 105 to generate output content based on various input videos, including an input video 120 (which may be a copy of the input video 110). For example, the administrator can use a language-dynamic video player 118 (or another player or application) to submit a request to the management system server 102 to obtain output content for the input video 120. For example, the administrative user can request to generate translation of the input video 120 (and other videos) in one or more languages that are different from a source language used in the input video 120. Similar to the local video processing engine 116, the administrator client device 105 can include a local video processing engine 122, which can be used to generate output content in a standalone fashion rather than from submitting requests to the management system server 102.

Although user-submitted requests are described, in some implementations, the management system server 102 generates output for input video(s), such as in batch processes. For example, the management system server 102 can create output(s) for providing versions of input video(s) in languages other than original languages used in the input video(s).

In general, the management system server 102 can identify an input video 124 to be processed, either as a result of an external request or as part of batch or server-based processing. When the processing of the input video 124 is for creating translated outputs based on the input video 124, a language identifier 126 can determine a source language of the input video 124 (e.g., by evaluating content of the input video 124), if a source language was not specified in a video processing request.

In some implementations, a pre-processor 128 can pre-process the input video 124. Preprocessing the input video 124 can include one or more of inserting duplicate frames into the input video or splitting the input video into multiple video portions.

A metadata generator 130 can automatically identify elements, such as, e.g., text elements, object elements, and spoken utterances, in or at corresponding frames or time offsets of the input video 124. For example, a text recognition engine 132 and an object recognition engine 134 can be used to identify text elements and object elements, respectively.

The metadata generator 130 can automatically generate metadata 136 for the identified elements. In some implementations and in descriptions below, metadata 136 may be referred as and may be stored in) a video content descriptor file or resource. For text elements and object elements, automatically-generated metadata 136 can include token values, frame information, time offset information, and positional information corresponding to the identified elements. For spoken utterances, automatically generating metadata 136 can include determining time offsets of the spoken utterances, generating a token value for each spoken utterance, and using a speech to text engine 138 to perform a speech to text conversion of the spoken utterances to generate text corresponding to the spoken utterances.

In some implementations and for some requests, the video processing request is simply to create the metadata 136, which can be provided to a requester or stored in the management system server 102 or in another system. In other implementations or for other requests, the video processing engine 114 can determine that at least some of the identified elements are targeted for replacement. For example, when the video processing request is a request to translate the input video 124 into a target language that is different from a source language of the input video 124, the video processing engine 114 can determine that text (and possibly audio) elements are to be translated. In some implementations, the video processing engine 114 can include logic that prevents translation of certain types of elements (such as URLs (Uniform Resource Locators)) from being translated, even if the element includes source-language content, when the element type indicates that maintaining untranslated text is desired.

As another example, some requests can correspond to requesting that identified elements that are included in or otherwise substantially match an entry in a dictionary 139 (e.g., a lookup table or another appropriate data structure) are to be replaced with corresponding replacement entries (e.g., replacement text) included in the dictionary 139. Replacement entries are not necessarily language translations of original values. As yet another example, some requests may correspond to requesting that some or all object elements are to be replaced with replacement elements or values. For example, replacement elements or values can include text replacement values or object replacement values (e.g., for replacing an object with another type of object or another object instance). Replacement elements or values for replacing objects can be specified in the dictionary 139 or in another type of resource.

A replacement value identifier 140 can determine replacement values 141 for the identified elements that have been targeted for replacement. For instance, when the request corresponds to replacing based on the dictionary 139, replacement values 141 can be identified from the dictionary 139. When the video processing request is to create translated output(s) for the input video 124, the translation service 106 can be used to obtain translated versions of text elements and text corresponding to spoken utterances. In some implementations, the translation service 106 is invoked automatically. In other implementations or for other requests, manual translation can be performed and the video processing request may include (or refer to) manually produced translations of text items in the input video 124.

The metadata generator 130 can generate updated metadata 142 based on the metadata 136 and the identified replacement values 141. In some implementations and in descriptions below, updated metadata 142 may be referred as (and may be stored in) an updated (e.g., translated) video content descriptor file or resource. As an example, the updated metadata 142 can include metadata entries for the identified elements that are targeted for replacement and that have been updated to include corresponding replacement values 141. Updating metadata entries for the identified elements that are targeted for replacement can include adding translated text values to corresponding metadata entries.

In some implementations, generating updated metadata 142 can include normalizing the metadata. Normalizing the metadata can include modifying some metadata entries so that metadata entries are consistent, with respect to units, labels, or other attributes. In some implementations, generating updated metadata 142 can include modifying metadata entries to include rendering code. For example, a text value that is determined to be a URL can be modified to include link markup tag(s) so that when rendered the text value appears as a selectable link.

Generating updated metadata 142 can include splitting a single metadata entry into multiple metadata entries or combining multiple metadata entries into a single metadata entry. In some implementations, generating updated metadata 142 can include presenting visual representations (e.g., bounding boxes) of identified elements in a user interface, such as the language-dynamic video player 118, to enable the administrative user to interact with the visual representations. Metadata 136 can be updated, to create the updated metadata 142, in response to user interactions with the visual representations. For example, the administrative user can move, merge, split, or edit the visual representations, to obtain a desired output or effect before outputs are consumed by end users.

As described in more detail below, various types of outputs can be generated based on the updated metadata 142. For example, one or more new video asset(s) 144 can be created that include the identified replacement values 141. For instance, the new video asset(s) 144 can include video content from the input video 124 that includes translated versions of text and audio that has been translated to a new language. The new-language audio can be generated by a text-to-speech engine 145 based on translated text values included in the updated metadata 142.

As another example, overlay content 146 that includes replacement values 141 can be generated (e.g., by a renderer 147) in preparation for superimposing the overlay content 146 on top of original values in the input video 124. In some implementations, the overlay content 146 is generated by the renderer 147 in response to the video-processing request. In other implementations, code for rendering (e.g., HTML (HyperText Markup Language), CSS (Cascading Style Sheets)) is generated and stored in the updated metadata 142 and a renderer included in the language-dynamic video player 112 (or the language-dynamic video player 118) renders the code for rendering. Other overlay approaches can include generation of (e.g., transparent) images to be superimposed over frames of the input video 124. Use of overlay approaches can enable content to be accessible by assistive technologies such as screen readers for the visually impaired.

Generated output content, including updated metadata 142, new video asset(s), and/or overlay content 146 can be provided, e.g., to the end-user client device 104 or the administrator client device 105, for viewing and/or storage of the generated output. For instance, new video assets 148a and a video content descriptor 149a (which may include or correspond to the updated metadata 142 and the overlay content 146) may be provided to the administrator client device 105 (e.g., for the administrator to view and therefore test whether the generated outputs are acceptable). As another example, new video asset(s) 148b and a video content descriptor 149b may be provided to the end-user client device 104, for storage and/or to enable the end user to use the generated output content.

For example, generated output content can facilitate viewing of content of the input video 110, in the language-dynamic video player 112, with original values replaced with replacement values. Regardless of whether a rendering strategy includes use of new video asset(s) 148b or overlay content, the generated output content can seamlessly appear to the end user as a version of the input video 110 that has been modified to include replacement of original values with replacement values.

For example, the new video asset(s) 148b can be loaded and presented in the language-dynamic video player 112. The new video asset(s) 148b may completely replace the input video 110 or may replace portions of the input video 110 (e.g., the language-dynamic video player 112 may alternatively play portions of the input video 110 and the new video asset(s) 148b).

As another example, when overlay content is received by the end-user client device 104 (e.g., in the video content descriptor 149b or as separately-received content), the overlay content can be rendered in the language-dynamic video player 112 over original values as corresponding frames of the input video 110 are being presented by the language-dynamic video player 112 during playback of the input video 110.

Although "language-dynamic video player" is described, in some implementations and for some rendering strategies, other types of video players can be used, including a standard video player. For example, in some implementations or for some inputs, a new video asset 148b can completely replace the input video 110, and can therefore be played in any video player configured to play video content in the format of the new video asset 148b.

As used in the present disclosure, the term "computer" is intended to encompass any suitable processing device. For example, although FIG. 1 illustrates a single management system server 102, a single end-user client device 104, and a single administrator client device 105, the system 100 can be implemented using a single, stand-alone computing device, two or more management system servers 102, or multiple client devices. Indeed, the management system server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the management system server 102 and the client devices 104 and 105 may be adapted to execute any operating system, including Linux, UNIX, Windows, Mac OS®, Java™, Android™, iOS or any other suitable operating system. According to one implementation, the management system server 102 may also include or be communicably coupled with an e-mail server, a Web server, a caching server, a streaming data server, and/or other suitable server.

Interfaces 150, 152, 154, and 155 are used by the management system server 102, the end-user client device 104, and the administrator client device 105, respectively, for communicating with other systems in a distributed environment—including within the system 100 connected to the network 108. Generally, the interfaces 150, 152, 154, and 155 each comprise logic encoded in software and/or hardware in a suitable combination and operable to communicate with the network 108. More specifically, the interfaces 150, 152, 154, and 155 may each comprise software supporting one or more communication protocols associated with communications such that the network 108 or interface's hardware is operable to communicate physical signals within and outside of the illustrated system 100.

The management system server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the management system server 102. Specifically, each processor 156 executes the functionality required to receive and respond to requests from the end-user client device 104 and the administrator client device 105, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The management system server 102 includes memory 158. In some implementations, the management system server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including video files, metadata, caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the management system server 102.

The end-user client device 104 and the administrator client device 105 may each generally be any computing device operable to connect to or communicate with the management system server 102 via the network 108 using a wireline or wireless connection. In general, the end-user client device 104 and the administrator client device 105 each comprise an electronic computer device operable to receive, transmit, process, and store any appropriate data associated with the system 100 of FIG. 1. The end-user client device 104 and the administrator client device 105 can each include one or more client applications, including the language-dynamic video player 112 or the language-dynamic video player 118, respectively. A client application is any type of application that allows the end-user client device 104 or the administrator client device 105 to request and view content on a respective client device. In some implementations, a client application can use parameters, metadata, and other information received at launch to access a particular set of data from the management system server 102. In some instances, a client application may be an agent or client-side version of the one or more enterprise applications running on an enterprise server (not shown).

The client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the management system server 102 and to receive and process responses from the management system server 102.

The end-user client device 104 and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the management system server 102, or the respective client device itself, including digital data, visual information, or the GUI 164 or a GUI 166, respectively.

The GUIs 164 and 166 interface with at least a portion of the system 100 for any suitable purpose, including generating a visual representation of the language-dynamic video player 112 or the language-dynamic video player 118, respectively. In particular, the GUI 164 and/or the GUI 166 may be used to view and navigate various Web pages. Generally, the GUI 164 and the GUI 166 provide a respective user with an efficient and user-friendly presentation of data provided by or communicated within the system. The GUI 164 and the GUI 166 may each comprise a plurality of customizable frames or views having interactive fields, pull-down lists, and buttons operated by the user. The GUI 164 and the GUI 166 each contemplate any suitable graphical user interface, such as a combination of a generic web browser, intelligent engine, and command line interface (CU) that processes information and efficiently presents the results to the user visually.

Memory 168 and memory 170 included in the end-user client device 104 or the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including video files, metadata, data structures, user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or administrator client devices 105 associated with, or external to, the system 100. For example, while the illustrated system 100 includes one end-user client device 104, alternative implementations of the system 100 may include multiple end-user client devices 104 communicably coupled to the management system server 102 and/or the network 108, or any other number suitable to the purposes of the system 100. Additionally, there may also be one or more additional end-user client devices 104 external to the illustrated portion of system 100 that are capable of interacting with the system 100 via the network 108. Further, the term "client", "client device" and "user" may be used interchangeably as appropriate without departing from the scope of this disclosure. Moreover, while the end-user client device 104 and the administrator client device 105 may be described in terms of being used by a single user, this disclosure contemplates that many users may use one computer, or that one user may use multiple computers.

Figure 2:
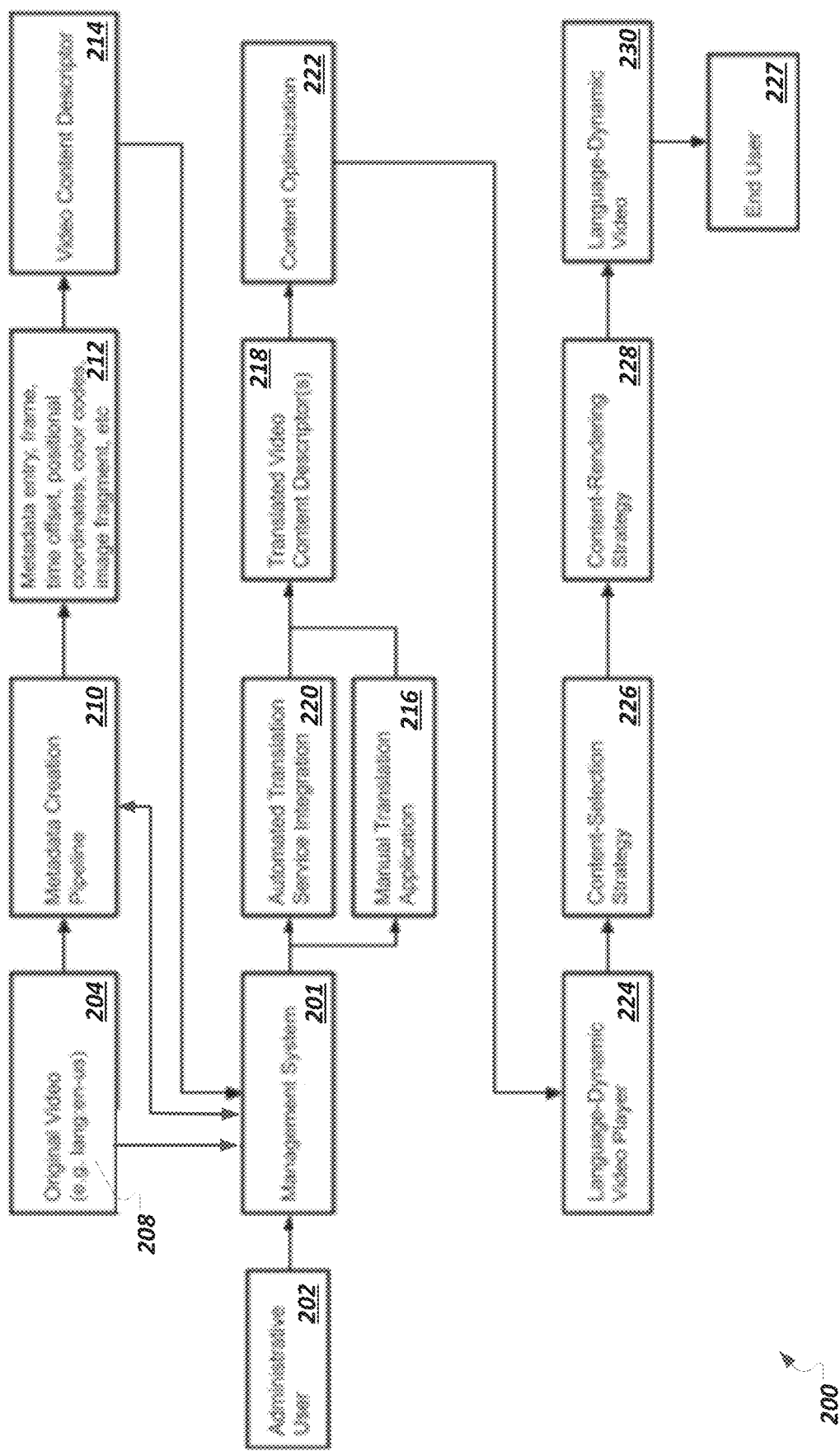
FIG. 2 illustrates an example system for creating language-dynamic content.

FIG. 2 illustrates an example system 200 for creating language-dynamic content. FIG. 2 illustrates an overall flow of processing with respect to a management system 201 in a translation example. In some implementations, the management system 201 is the management system server 102 of FIG. 1.

A user 202 (e.g., an administrative or other type of user) can upload a video 204 into the management system 201. A language 208 in which text of the video 204 is presented can be determined in various ways. For example, the user 202 may indicate the language 208. As another example, the management system 201 may be configured with a default language signifier that can detect the language 208 based on an evaluation of the video content.

The management system 201 can provide the video 204 to a metadata creation pipeline 210 that includes one or more video and audio analysis technologies for the purpose of detecting text in the video visuals, detecting fiducials (e.g., QR (Quick Response) codes) in the video visuals, detecting spoken words in the audio associated with the video, and converting detected spoken words to text. As described in more detail below, output 212 of the metadata creation pipeline 210 can include metadata entries, frame information, time offsets, positional coordinates, color codes, image fragments, and other types of output. Although shown as separate from the management system 201, in some implementations, the metadata creation pipeline 210 is included in the management system 201. In some implementations, the metadata creation pipeline 210 corresponds to the metadata generator 130 of FIG. 1. Other labeled aspects of FIG. 2 are described below with reference to FIGS. 9, and 12.

Figure 3:
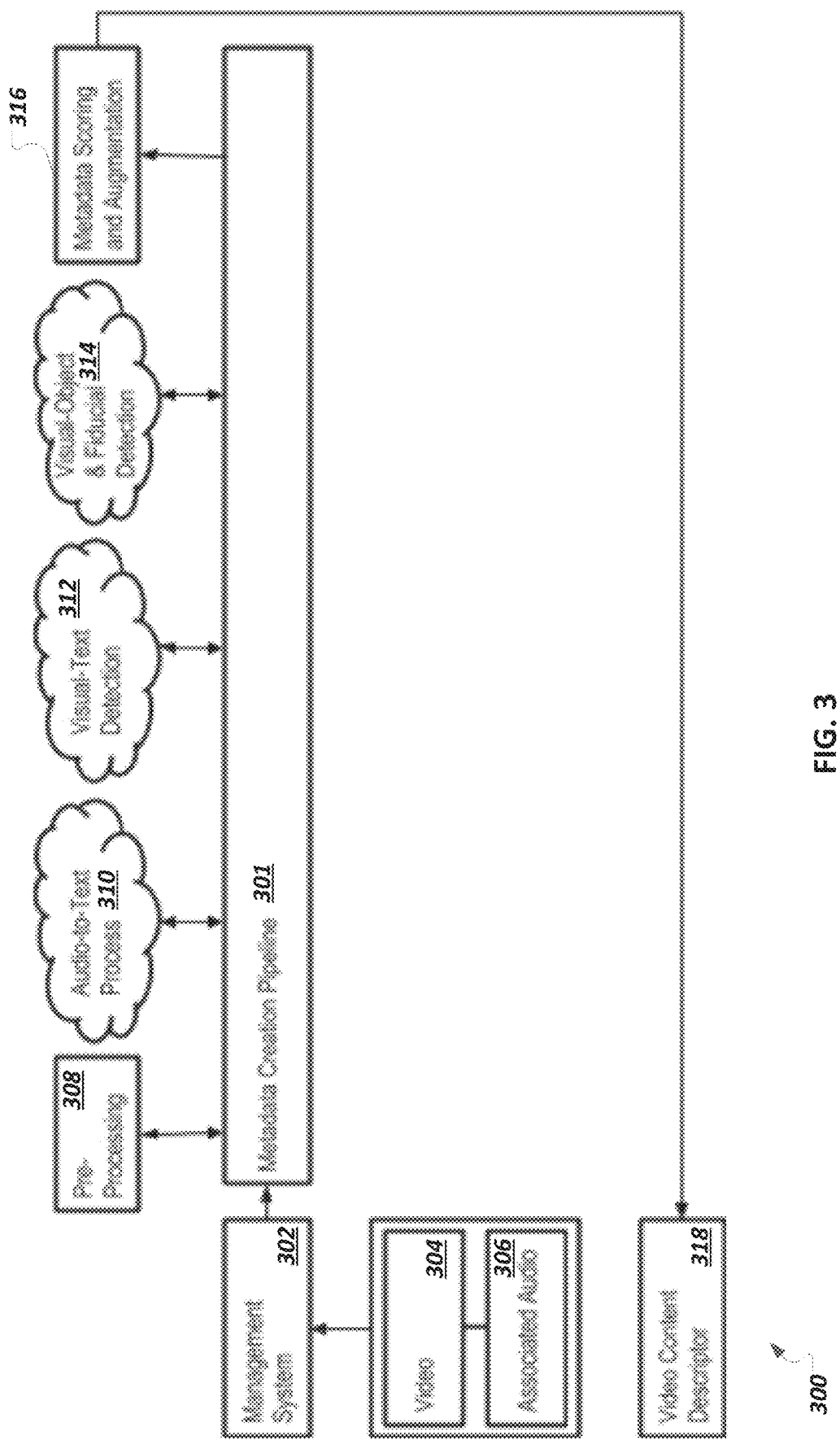
FIG. 3 illustrates an example system that includes a metadata creation pipeline.

FIG. 3 illustrates an example system 300 that includes a metadata creation pipeline 301. The metadata creation pipeline 301 can correspond to the metadata creation pipeline 210 of FIG. 2. FIG. 3 illustrates additional metadata creation details as compared to the system 200 of FIG. 2. As described above, a management system 302 (e.g., the management system 201) can provide a video 304 (e.g., the video 204), and associated audio 306, to the metadata creation pipeline 301. Various portions of the metadata creation pipeline 301 are described below.

A pre-processing engine 308 included in the metadata creation pipeline 301 (which can be the pre-processor 128 of FIG. 1) can pre-process the video 304 (and/or the associated audio 306). Pre-processing may include splitting the video 304 as a single video asset into multiple assets (e.g., multiple subvideo assets) based on overlapping or non-overlapping timecode offsets. Splitting the input video into multiple assets can enable parallel processing of each asset in order to accelerate an overall speed of processing. The results of processing each asset can then be recombined as a single video-descriptor. As another example, pre-processing may include inserting additional duplicated frames into video assets so as to increase the duration of the video assets and provide more frames in which to detect visual elements, thereby increasing the accuracy of detection.

An audio-to-text process 310 provided by the metadata creation pipeline 301 can be performed to detect spoken words in the associated audio 306. Technologies utilized for detection of spoken word in the associated audio 306 may include, but are not limited to, speech-to-text algorithms and artificial intelligence. Spoken word detection can include the production of metadata and a timecode offset for each spoken utterance.

A visual-text detection process 312 provided by the metadata creation pipeline 301 can be performed to detect text in the video 304. Technologies utilized for detecting text in video visuals may include, but are not limited to, OCR, machine vision, and artificial intelligence visual analysis. Text detection technologies can be used to produce metadata descriptions for detected text, a matrix of coordinates where the detected text appears in the video frame, and a frame number, frame sequence, timecode offset, and/or timecode range associated with detected text.

A visual object and fiducial detection process 314 provided by the metadata creation pipeline 301 can be performed to detect fiducials and other Objects in the video 304. Technologies utilized for detecting fiducials in video visuals may include, but are not limited to, object detection algorithms, machine vision, or AI (Artificial Intelligence) technologies. Fiducial detection technologies can be configured or trained to detect specific shapes, contours, color codes, and/or color contrasts between shapes or contours. Fiducial detection can include the production of a matrix of coordinates where the fiducial occurs in the video frame and a frame number, frame sequence, timecode offset and/or timecode range associated with the detected fiducial.

The metadata creation pipeline 301 may be configured to execute audio and/or video analysis technologies in any order, serially or in parallel. The metadata creation pipeline 301 may optionally allow the output from each sub-process to be formatted and provided as input to the next sub-process in an ordered sequence.

A metadata scoring and augmentation process 316 provided by the metadata creation pipeline 301 can be performed which can produce a video content descriptor 318 that is persisted by the management system 302, The video content descriptor 318 corresponds to the video content descriptor 214 in FIG. 2. The video content descriptor 214 can be persisted to the management system 201.

The metadata scoring and augmentation process 316 can include normalizing the format of metadata created in the metadata creation pipeline 301 and comparing metadata values from various processes in the metadata creation pipeline 301 in order to generate new metadata. The normalization process can include ensuring labels, units, and structural semantics of the metadata are consistent, performing spelling and grammar corrections of metadata values, and grouping or splitting text metadata values into words, sentences and phrases.

Figure 4:
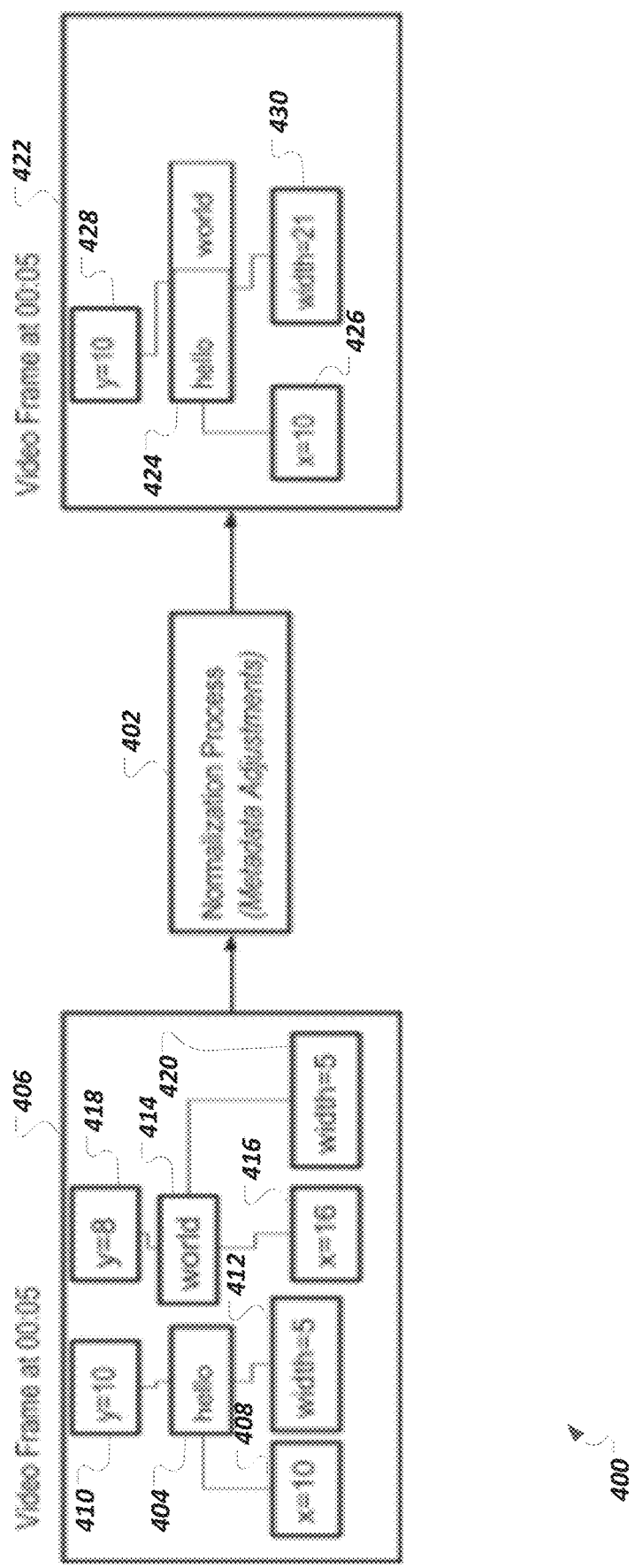
FIG. 4 illustrates an example system for performing a normalization process for combining metadata entries.

FIG. 4 illustrates an example system 400 for performing a normalization process 402 for combining metadata entries. The normalization process 402 can be part of the metadata scoring and augmentation process 316 described above with respect to FIG. 3. For example, the normalization process 402 can include comparing the proximity of bounding boxes containing detected text and combining certain metadata entries based on the comparisons. For example, a bounding box can be defined by top, left, height and width values derived from the visual position metadata. When a bounding box A is within a configured positional difference threshold of a bounding box B, entries for the bounding box A and the bounding box B may be combined. When detected text values in the metadata are combined into one metadata entry or split into several entries, the normalization process 402 can include calculation of adjustments to visual position(s) and time offset(s) to accommodate the combined or split values.

For example, a first metadata entry associated with a text value 404 detected in a video frame 406 may include the text value "hello," with a position of x1=10 408, y1=10 410, and width1=5 412, and a time offset1 of 00:05. A second, different metadata entry for a text value 414 detected in the video frame 406 may include the text "world," with a position of x2=16 416, y2=8 418, and width2=5 420, and a time offset2 of 00:05.

A "left" position distance threshold can be configured as ((x1+w1)+(w1/(number of character in boxA text))*3). A "top" position distance threshold can be configured as ((y1+h1)−(h1/2)). When a first text value is within the left position distance threshold and the top position threshold of a second text value, the normalization process 402 can, for example, include combining corresponding first and second metadata entries into a combined metadata entry, as illustrated for an updated video frame 422. The combined metadata entry can be for a combined text value 424 with the text "hello world," with a position of x=10 426 (e.g., x=x1), y=10 428 (e.g., y=y1), width=21 430 (e.g., width= (x2±width2−x1)), and a time offset of 00:05.

Figure 5:
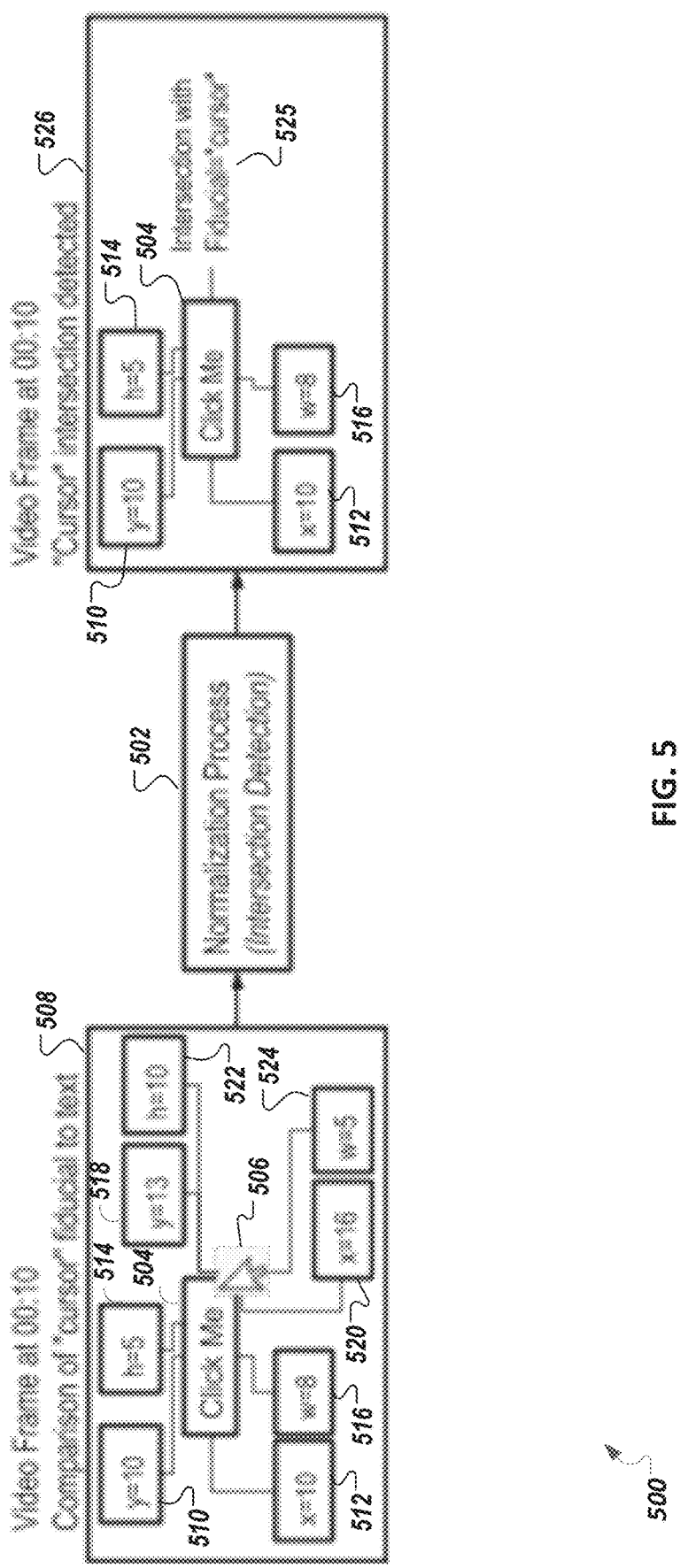
FIG. 5 illustrates an example system for performing a normalization process based on detection of an intersection of two objects.

FIG. 5 illustrates an example system 500 for performing a normalization process 502 based on detection of an intersection of two objects. The normalization process 502 can be part of the metadata scoring and augmentation process 316 described above with respect to FIG. 3. For example, the normalization process 502 can include comparing bounding boxes of one or more text entries and of one or more detected fiducial or other objects to detect an intersection of two or more objects. For instance, the normalization process 502 can include detection logic which can be expressed as: WHEN (boxA.top>=box.B.top) AND (boxA.torboxB.top+boxB.height) AND (boxA.left>=boxB.left) AND (boxA.left<boxB.left+boxB.width) THEN boxA and boxB intersect.

Execution of the above logic for comparing a text box 504 and a cursor 506 included in a video frame 508 can include comparing metadata of the text box 504 to metadata of the cursor 506, evaluating a top value (e.g., y-value) 510, a left value (e.g., x-value) 512, a height value 514, and a width value 516 of the text box 504 and a top value 518, a left value 520, a height value 522, and a width value 524 of the cursor 506. Specifically, the above logic applied to the text box 504 and the cursor 506 can be represented as: WHEN (cursor.top>=textbox.top) AND (cursor.top<textbox.top+ textbox.height) AND (cursor.left>=textbox.left) AND (cursor.left<textbox.left+textbox.width) THEN the cursor and text box intersect. Evaluation of the intersection logic by substituting appropriate attributes of the text box 504 and the cursor 506 can result in evaluation of the following expression: (13>=10) AND (13<10+5) AND (16>=10) AND (16<10+8), which evaluates to a Boolean value of TRUE, which in turn indicates that the cursor 506 and the text box 504 intersect.

In the case of an intersection, additional metadata may be added to the respective entries denoting which entries have intersected. Additional metadata corresponding to the example of FIG. 5 is illustrated by a note 525 in an updated video frame 526. The note 525 indicates that the text box 504 has intersected with the detected cursor 506. When a text box and an object (e.g., a cursor) intersect, a metadata entry can include position and size values for the text box, as shown. Intersection with, for example, a cursor or other object can indicate semantic information of an intersecting element. For instance, intersection with a cursor can indicate that a text box includes important information, or that a video creator intended to draw focus to the element. Additional metadata added to indicate the intersection can be used by the system as a flag for manual review or as an indication to apply special formatting for the element for output rendering.

Figure 6:
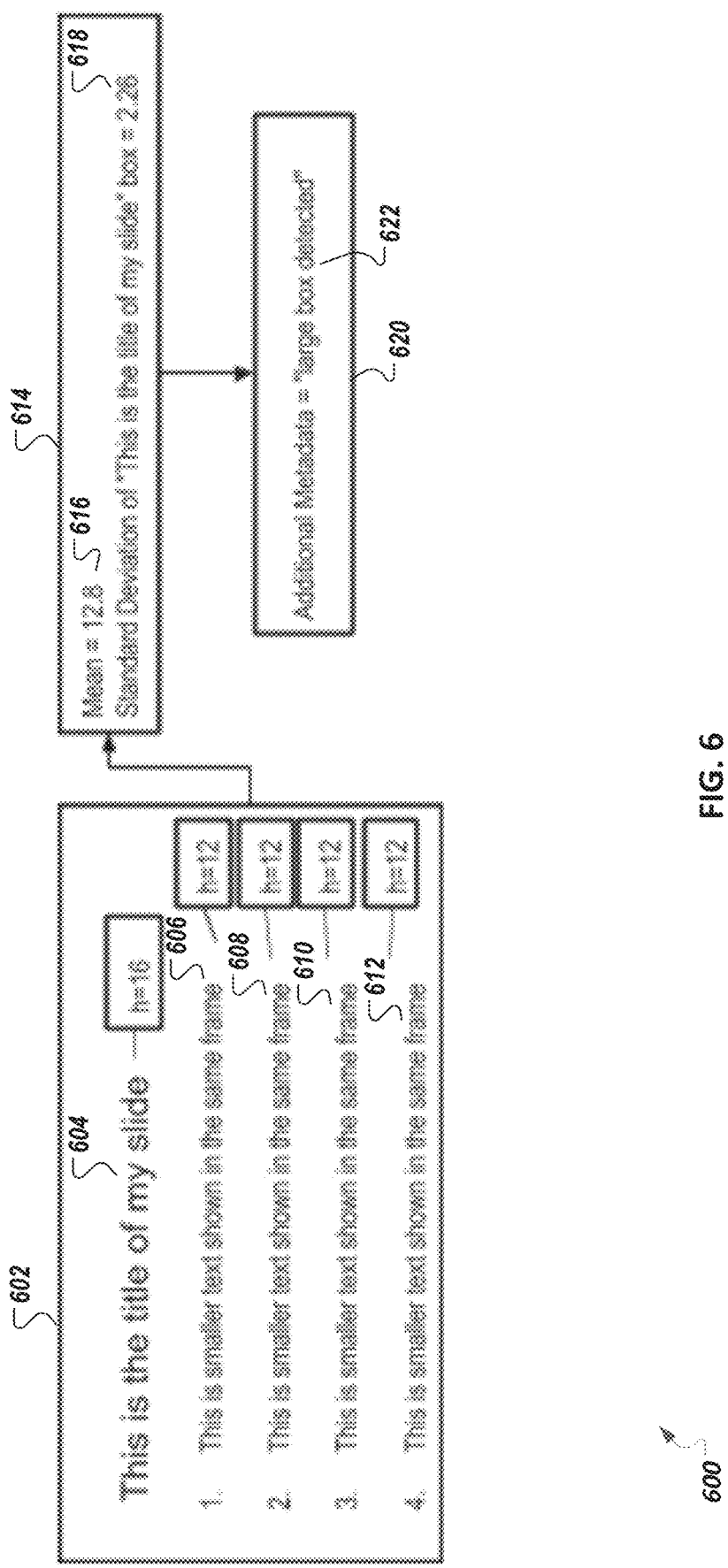
FIG. 6 illustrates an example system for identifying large objects.

FIG. 6 illustrates an example system 600 that illustrates a process for identifying large objects. Identifying large objects can be part of the metadata scoring and augmentation process 316 described above with respect to FIG. 3. For example, the metadata scoring and augmentation process 316 can include performing an algorithm to compare the size of bounding boxes of text entries including calculating a mean height value of all bounding boxes and identifying bounding boxes whose height metadata value is two or more standard deviations from a mean height value (e.g., to identify "large" bounding boxes). When a large bounding box is identified, additional metadata can be added to the metadata entry indicating the bounding box as a large box.

For example, the algorithm can be used to detect a large title 602 included in a frame 604 with other smaller text items 606, 608, 610, and 612. As indicated in a note 614, a mean height value 616 of the large title 602 and the other smaller text items 606, 608, 610, and 612 is 12.8. The height of the large title 602 (e.g., a height of 16) is 2.26 standard deviations 618 from the mean height value 616. Accordingly, the large title 602 can be identified as a large object, and as indicated in a note 620, additional metadata 622 can be included with a metadata entry for the large title 602, to indicate that the large title 602 has a large bounding box (and is therefore a large object). A large text box can indicate an intent of a video creator to make that element important and highlighted for a user. A large text box indication can be used for generating semantic HTML overlay markup, such as using an H1 (e.g., important header) tag.

Figure 7:
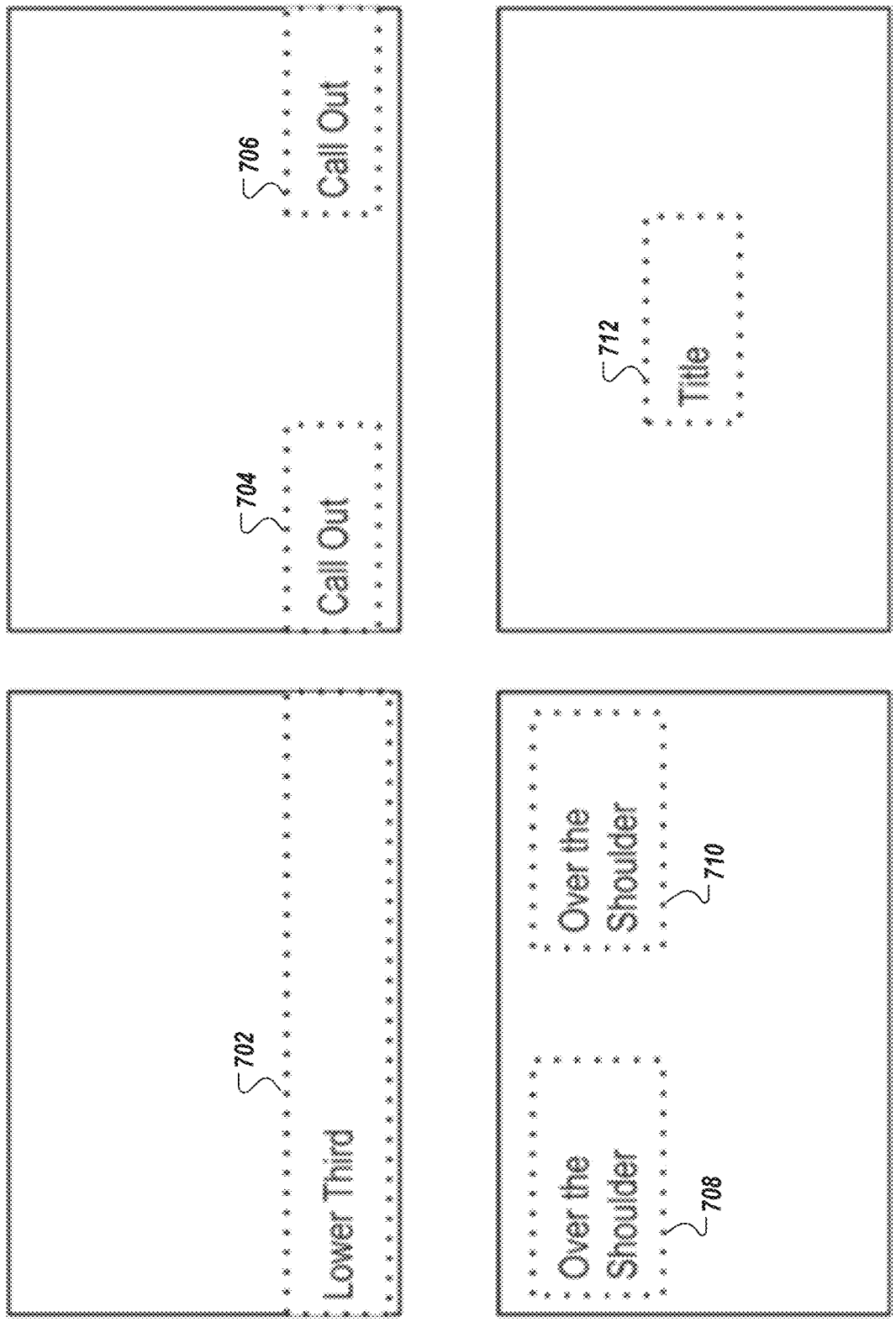
FIG. 7 illustrates an example system for augmenting metadata entries based on positioning information.

FIG. 7 illustrates an example system 700 for augmenting metadata entries based on positioning information. Augmenting metadata entries based on positioning information can be part of the metadata scoring and augmentation process 316 described above with respect to FIG. 3. For example, the metadata scoring and augmentation process 316 can include performing an algorithm to augment metadata entries based on positioning information of objects with respect to a set of predetermined bounding boxes located in predetermined areas typically used in video production for the placement of important text elements or visuals. For example, the algorithm can include detecting intersections of text with the predetermined bounding boxes using a technique similar to that described above for fiducial and object intersections. Predetermined bounding boxes may represent areas such as a "lower third" area 702, "over the shoulder" areas 704 or 706, "call out" areas 708 or 710, or a title area 712. When intersection(s) are detected with a predetermined area, additional metadata can be added to an entry to indicate an intersection of a respective bounding box (and its associated content) with a particular type of area. Intersections with a predetermined area can be used as a signal to combine multiple elements which intersect a same predefined area. As another example, intersection with a predefined area can be used to assign values that can be used for rendering semantic HTML overlays (e.g., to include special formatting in the rendered overlay based on the detected intersection).

Figure 8:
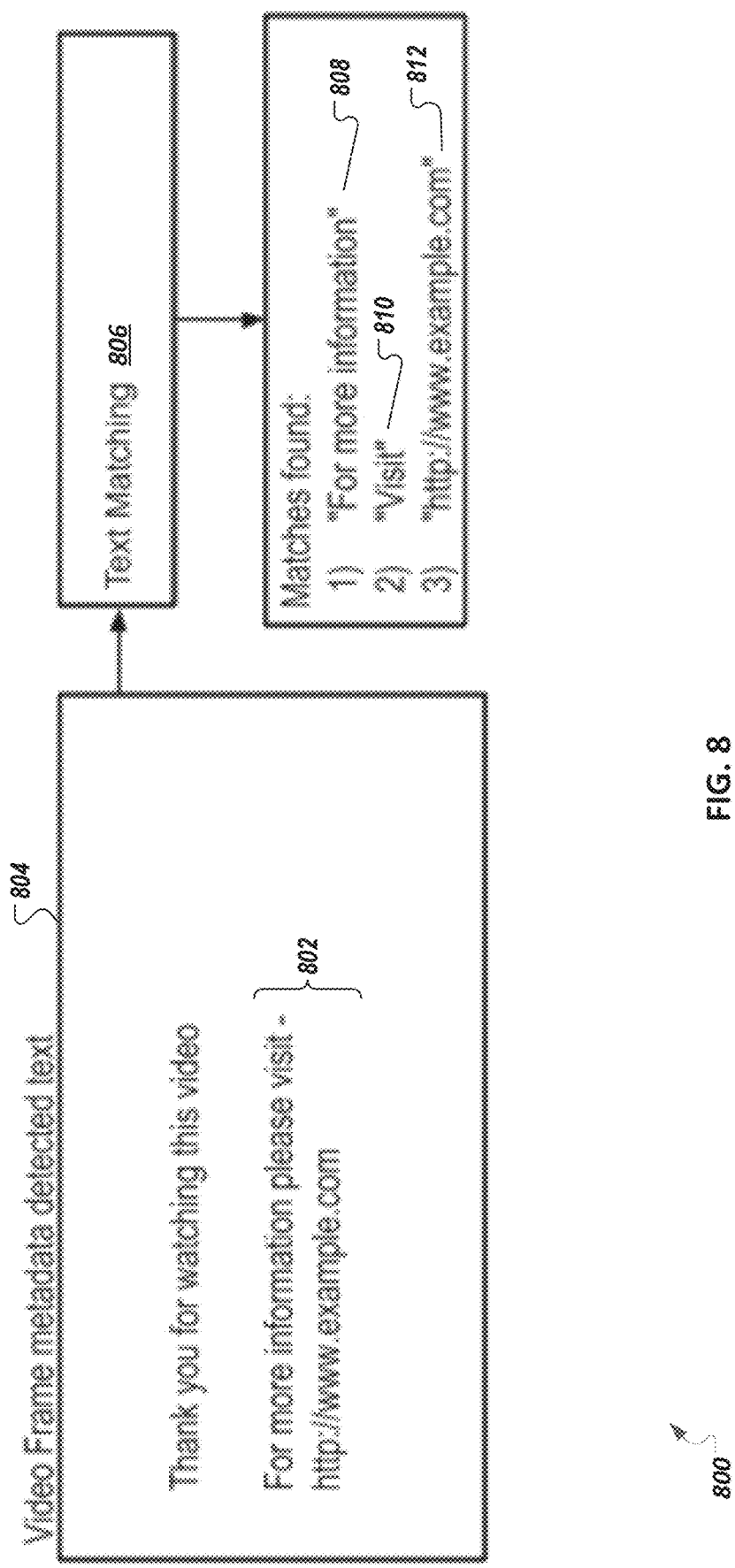
FIG. 8 illustrates an example system for determining a meaning of a detected text value.

FIG. 8 illustrates an example system 800 for determining a meaning of a detected text value. For example, determining the meaning of detected text values may include the use of dictionaries (e.g., a locally-stored dictionary or a dictionary resource available over a network) for key terms and/or regular expression patterns known to a management system from prior configuration. When a match is determined based on a comparison of key terms or regular expression patterns in dictionaries to detected text values, additional metadata can be added to a corresponding metadata entry to indicate the match. For example, the terms "click here," "find out more," "learn more," "request information," "go to" "visit," "call," "report" may be present in a dictionary as examples of terms with semantic importance.

As another example and as shown in FIG. 8, detected text data 802 in a video frame 804 can be provided to a text matching engine 806. The text matching engine 806 can identify, from the text data 802, matching text values "For more information" 808, "Visit" 810, and "http://www.example.com" 812 as each matching a pre-configured key term. Accordingly, corresponding key-term match indications can be stored in one or more metadata entries associated with the text data 802. Semantic importance indications can be communicated to an administrative user and/or be used when generating semantic HTML overlay markup.

Referring again to FIG. 2, when the video content descriptor 214 is persisted to the management system 201, the video content descriptor 214 may be further augmented with references to closed caption files or data, as well as annotation metadata generated by the metadata scoring and augmentation process 316 (as described above with respect to FIGS. 4-8). As another example, an administrator can augment the video content descriptor 214 with annotation metadata. Annotation metadata can be information either automatically generated or manually entered that can be used, for example, to define or generate overlay content.

As another example, the user 202 can use an API or user interface to download the video content descriptor 214, perform manual translations of the text values (e.g., using a manual translation application 216), and upload translated video content descriptors 218 in association with a language-code indicating the language of the translations. As another example, the management system 206 can include an automated translation service engine 220.

FIGS. 9A, 9B, 10A, and 10B illustrate example user interfaces that provide various user controls for interacting with bounding boxes to affect changes in corresponding metadata entries. The user controls may, for example, enable inline editing of text values and adjusting bounding box sizing and position (e.g., top, left, width, height) using drag and drop functionality. User controls can also be used for combining bounding boxes into a single item or separating a single bounding box into multiple items, thus combining or separating associated text values, respectively. User controls may also be provided to adjust timecode sequence information by manipulating graphic elements associated with a timeline control of a video player.

Figure 9A:
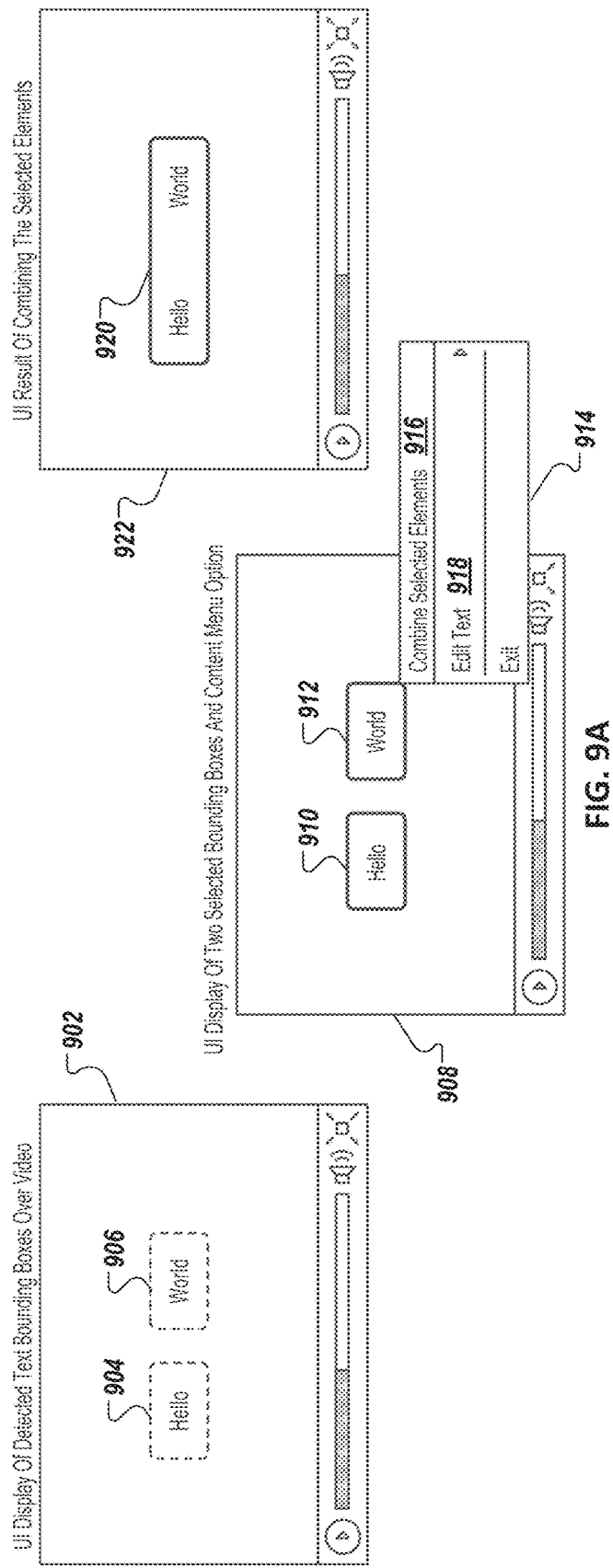

In further detail and as shown in FIG. 9A, a user interface 902 displays visualizations of bounding boxes 904 and 906, based on corresponding video content descriptor data items. The bounding boxes 904 and 906 can be superimposed in the user interface 902 on top of video content. The user interface 902 can support various types of user controls and user inputs to cause a corresponding change to occur to underlying, associated metadata.

For instance and as shown in a user interface 908, bounding boxes 910 and 912 (corresponding to the bounding boxes 904 and 906, respectively) have been selected by the user. Once one or more items have been selected in the user interface 908, the user can perform another user input (e.g., a right click, a double tap) to cause a context menu 914 to appear. The context menu 914 includes, among other items, a combine-selected-elements menu item 916 and an edit text menu item 918. In response to selection of the combine-selected-elements menu item 916, the bounding boxes 910 and 912 are combined, as shown by a combined bounding box 920 in an updated user interface 922. Metadata entries for the bounding box 910 and the bounding box 912 can be combined (e.g., merged) into a combined metadata entry that corresponds to the presented combined bounding box 920.

Figure 9B:
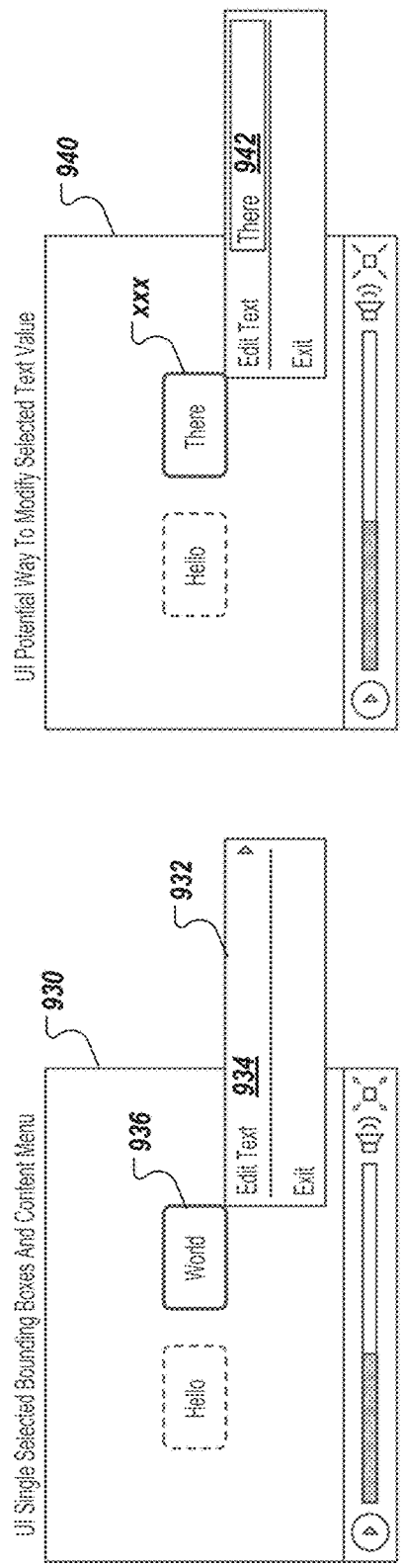

As another example and as shown in a user interface 930 in FIG. 9B, a context menu 932 is displayed that includes an edit text menu item 934 that can be selected to modify text of a selected bounding box 936. For instance, an updated user interface 940 includes an edit control 942 displayed in response to selection of the edit text menu item 934, that enables the user to modify text of the selected bounding box 936. For instance, the user has entered new text of "There" 936 in the edit control 942. In response to a finalizing of an edit operation with the edit control 942 (e.g., after the user presses an enter key or performs some other finalization input), text of the selected bounding box 936 can be changed to correspond to text of the edit control 942. For instance, the updated user interface 940 includes an updated bounding box 944 that includes an updated text value (e.g., of "There"), A metadata entry corresponding to the updated bounding box 944 can be changed to reflect the textual change made by the user.

As shown in a user interface 1000 in FIG. 10A, a user can adjust timecode sequence information by selecting an element 1002 and adjusting a timeline control 1004. For example, the user can adjust a current time offset 1006 (e.g., a time at which the element 1002 is appearing in the video) to an updated time offset 1008 shown for a corresponding element 1010 in an updated user interface 1012. By moving the timeline 1004 to a new offset, the user can configure the timing of when the element 1002 appears and disappears during presentation of the video.

As shown in a user interface 1030 in FIG. 10B, the user has selected a bounding box 1032 and desires to move the bounding box 1032 to a new location. A drag-and-drop control 1034 can be used by the user to move the bounding box 1032. For instance, the user can select the drag-and-drop control 1034 and move the drag-and-drop-control 1034 to a new location, as shown by an updated drag-and-drop control 1036 in an updated user interface 1038. The bounding box 1032 can be moved to a new position in accordance with a new position of the updated drag-and-drop control 1036 (e.g., as shown by an updated bounding box 1040). In some implementations, the user can select the bounding box 1032 and drag the bounding box 1032 to a new location. The drag-and-drop control 1034 may (or may not) appear as the bounding box 1032 is moved.

Figure 11:
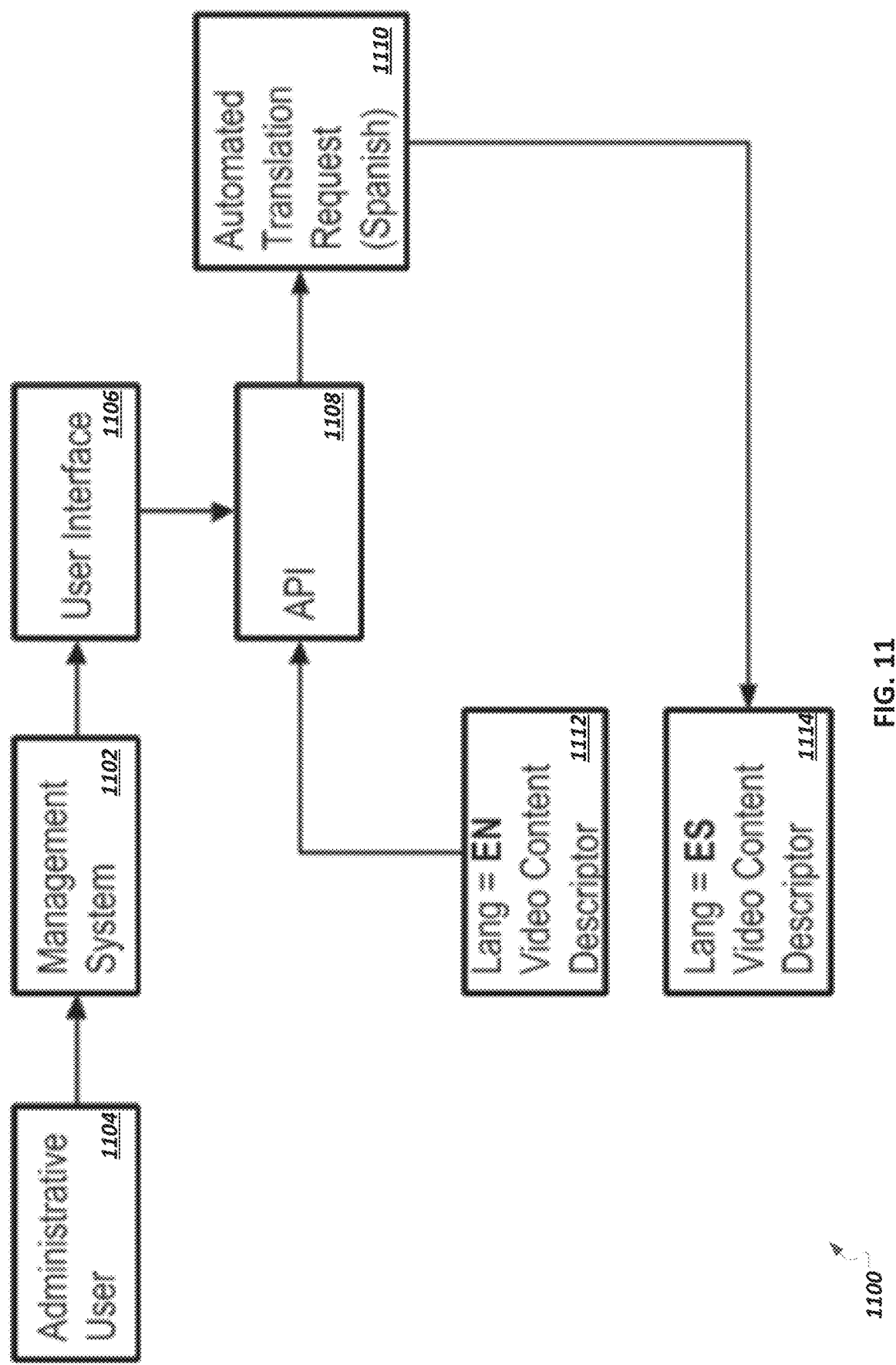
FIG. 11 illustrates an example system for automated translation service integration.

FIG. 11 illustrates an example system 1100 for automated translation service integration. A management system 1102 (e.g., the management system server 102 of FIG. 1) may use various technologies to programmatically request an automatic translation of text values, closed captions and/or annotation metadata, for example, in response to a request made by an administrative user 1104 (or an end user) using a user interface 1106. In response to the request from the administrative user 1104, the management system 1102 can use an API 1108 to submit an automated translation request 1110 to a translation service (such as the automated translation service integration component engine 220 described above with respect to FIG. 2). The automated translation request 1110 can include a target language (e.g., Spanish) and can include (or refer to) input video content descriptor data 1112 having an input language (e.g., English (EN)). The translation service can, in response to the automated translation request 1110, perform the requested translation and provide output video content descriptor data 1114 in the target language (e.g., Spanish (ES)). In the case of programmatic translation, the input video content descriptor data 1112 can be formatted according to the requirements of a particular translation technology or service before a translation request is made. Translation results included in the output video content descriptor data 1114 can be re-formatted (e.g., by the management system 1102) back into a video descriptor data format used by the input video descriptor data 1112.

Generated or uploaded video content descriptors can be associated, by using metadata, with an originally uploaded video object or a "container" object, which provides a reference to the video. Additionally, the user interface 1106 may enable the administrative user 1104 to create, read, update, and delete video content descriptor data, including all data created by the management system 1102, the metadata creation pipeline 301, and other integrated technologies.

Referring again briefly to FIG. 2, the translated video content descriptor 218 can be provided to a content optimization process 222. The content optimization process 222 can include creation of a new video resource that includes superimposed translated text.

Figure 12:
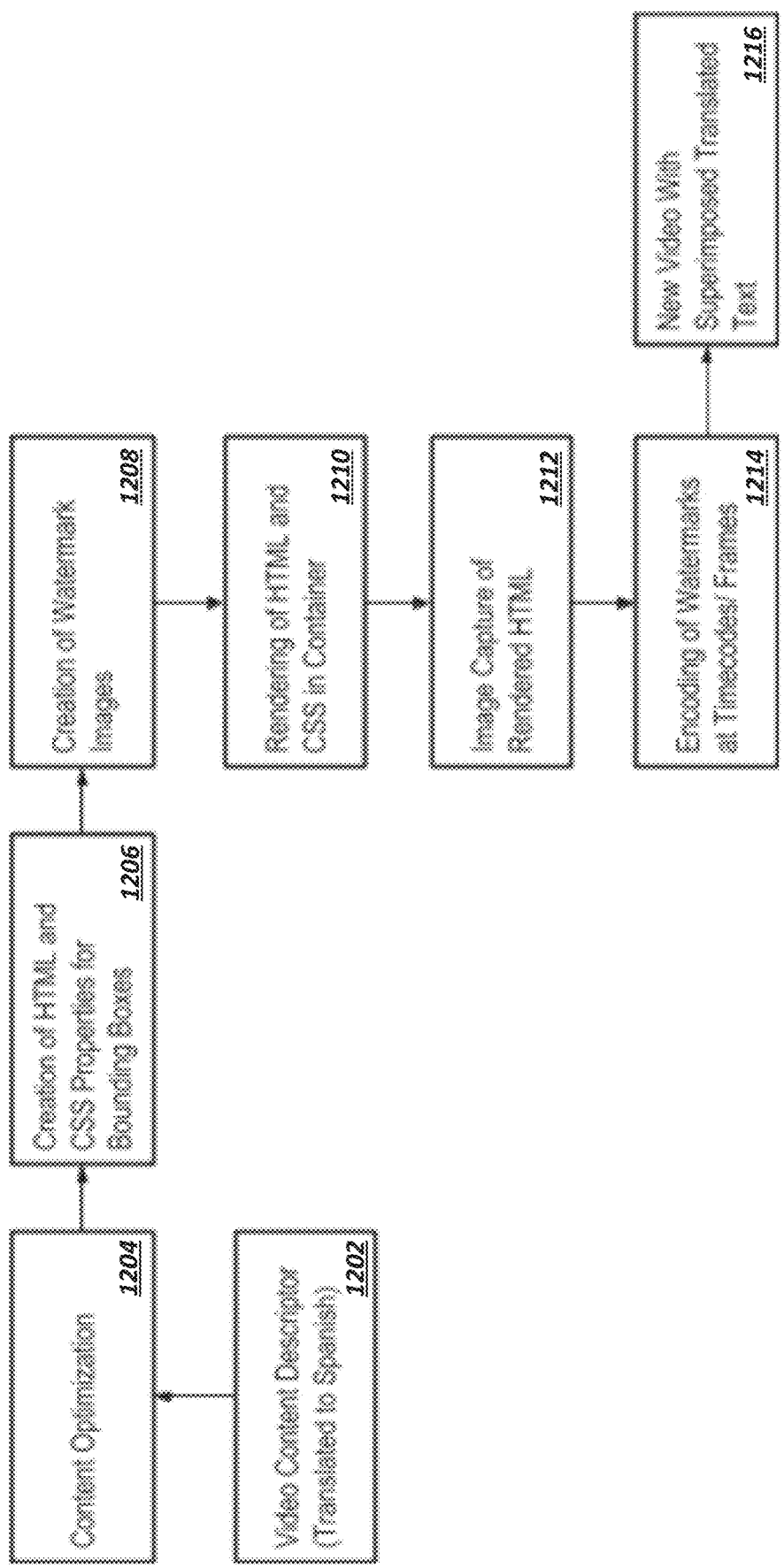
FIG. 12 illustrates an example system for creation of new video assets.

FIG. 12 illustrates an example system 1200 for creation of new video assets. A translated video content descriptor 1202 (e.g., the translated video content descriptor data 1114 of FIG. 11) can be provided to a content optimization process 1204 (which can be the content optimization process 222 of FIG. 2). In some implementations, the content optimization process 1204 can include creation 1206 of HTML5 (HyperText Markup Language version 5) and CSS (Cascading Style Sheet) elements and properties for bounding boxes.

For example, the generated HTML5 content can support various end-user input, interactions, events, and functions provided for in the HTML5 specification. Definition of HTML5 elements may occur in user interfaces or automatically in the content optimization process 1204 based on predetermined rules provided by the management system, to identify video descriptor entries based on their content and add additional data to augment the entry.

For example, suppose that the translated video content descriptor 1202 includes an entry with the text value "http://www.example.com" and that a predetermined rule programmatically states that text values in the format of a URL are to be reformatted as a link. In this example, additional metadata can be added to the entry indicating that the rendered HTML5 content should be formatted as a link, for example, using an anchor <a/> tag with an HREF attribute value of "http://www.example.com". Another example of a predetermined rule can include evaluating metadata created in a normalization process such as the intersection of bounding boxes or large box identification to classify the entry as having a specific semantic HTML association such as "button" or "title." In this example, HTML5 content appropriate for the semantics of the entry can be produced.

Additionally, the system may create 1208 watermark images that include translated text to be shown in a position, style and frame similar to the originally detected text. Watermark images may be generated automatically using a rendering process 1210 of rendering HTML fragments, in an HTML rendering-engine, which are sized, styled and positioned as defined by bounding box metadata onto an HTML, element of the same aspect ratio as the original video.

In general, the content optimization process 1204 can include the creation of MAIL markup and/or optimized data structures (e.g., within or associated with the translated video content descriptor 1202). The data structures and/or HTML markup can be used by the rendering process 1210. The rendering process 1210 can include rendering bounding boxes, text values and other properties in HTML as overlays on the language-dynamic video player based upon the translated video content descriptor 1202 (and potentially based on metadata, including closed captions and annotations, incorporated directly or by reference in the translated video content descriptor 1202).

An image of the composited HTML elements can then be captured 1212. The captured image can reflect applied CSS and HTML rendering capabilities of the rendering engine. The captured image can be configured with a transparent background for superimposition over video frame(s).

The system may encode 1214 one or more watermark images per frame, frame sequence, timecode, and/or range of timecodes. New video resource(s) 1216 can be created by the encoding 1214 of the original video with watermark images. The new video resource(s) 1216 can include the captured images superimposed over video frame(s). Information about created assets can be included in the metadata for the original video (e.g. in the translated video content descriptor file 1202). In some implementations, the original video may be re-encoded to visually remove the detected text prior to the creation of the new video resource(s) 1216. The new video resource(s) can be referred to as language-dynamic video resources.

Referring again briefly to FIG. 2, a new video resource, with e.g., encoded watermarks and superimposed translated text, can be provided to a language-dynamic video player 224. In some implementations, when the new video resource is loaded by the language-dynamic video player 224, the language-dynamic video player 224 can enable the user to view information used to create the new video resource, such as metadata that may include overlay content to be rendered when the new video resource is played or translated video assets which may have been automatically created as replacement video content, as well as their associated language codes. The language-dynamic video player 224 can be based upon HTML5 technologies for the playback of video content. The language-dynamic video player 224 can support loading data from a specified video content descriptor or a translated video. Video content descriptor data and/or translated videos can be loaded asynchronously while the original video is loading, paused or playing.

A content selection strategy 226 can be implemented for selecting which video assets to load or an order in which to load video assets, based, for example, on a language selected by an end user 227, a country in which the user is located (as described below), or other context information, A content rendering strategy 228 can be selected, among different content rendering strategies (as further described with reference to FIG. 14), and implemented by the language-dynamic video player 224 to cause a language-dynamic video 230 to be presented to the end user 227 in the language-dynamic video player 224.

Figure 13:
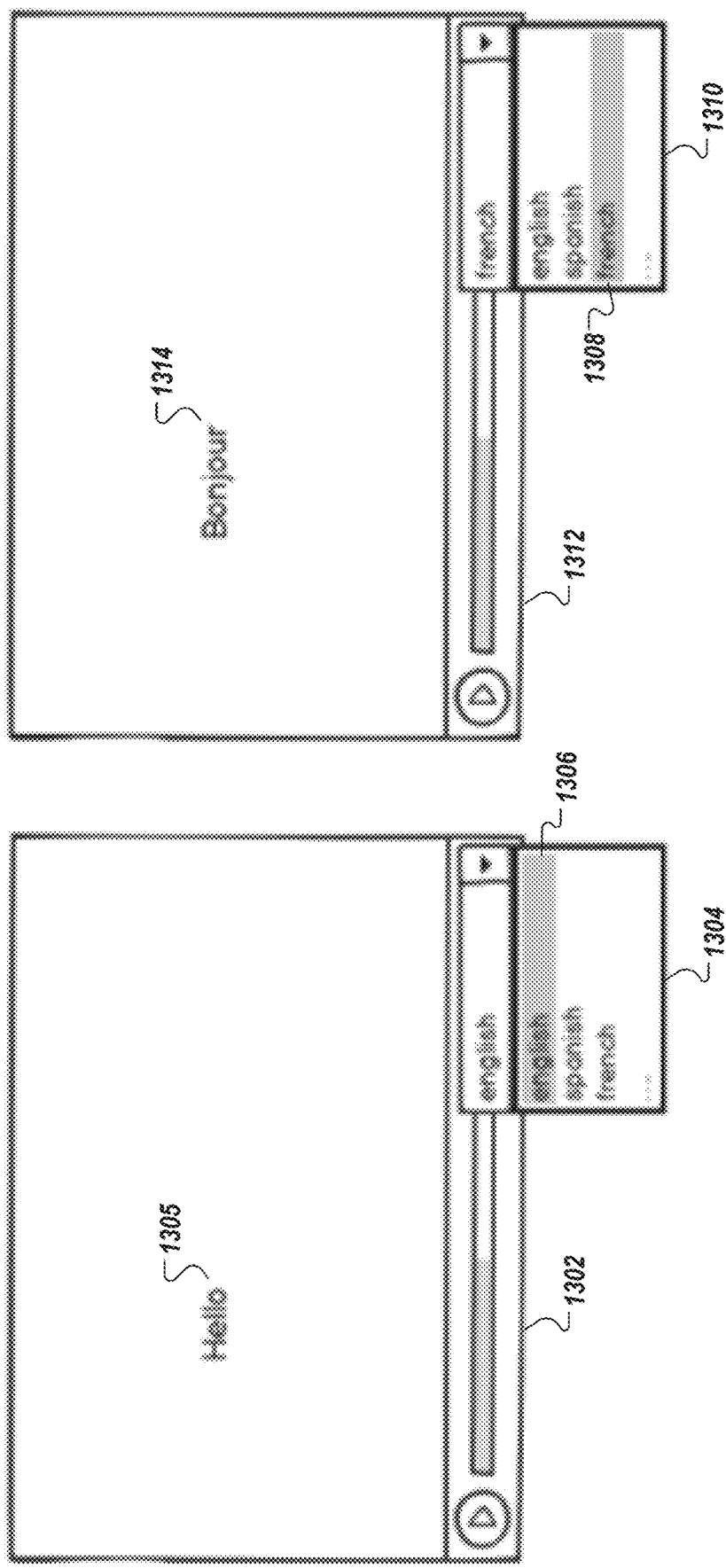
FIG. 13 illustrates example language-dynamic video player user interfaces.

FIG. 13 illustrates example language-dynamic video player user interfaces. A rendering strategy can be employed by a language-dynamic video player to display a loaded video descriptor and/or translated video content. For example, as shown in a language-dynamic video player user interface 1302, an end user can use a player control 1304 to select a preferred language from a list of languages specified in the metadata, to cause text, such as a text label 1305, to be displayed in the preferred language, rather than a current language. The current language 1306 (e.g., English) can be selected in the player control 1304 by default. Upon selection of a different (e.g., preferred) language 1308 (e.g., French), as illustrated in a player control 1310 in an updated language-dynamic video player user interface 1312, text in the visuals of the video can appear to change to the selected language, as illustrated by an updated text label 1314. Additionally, the text shown in closed captions and the text/other properties of annotations may also change to the selected language.

Figure 14:
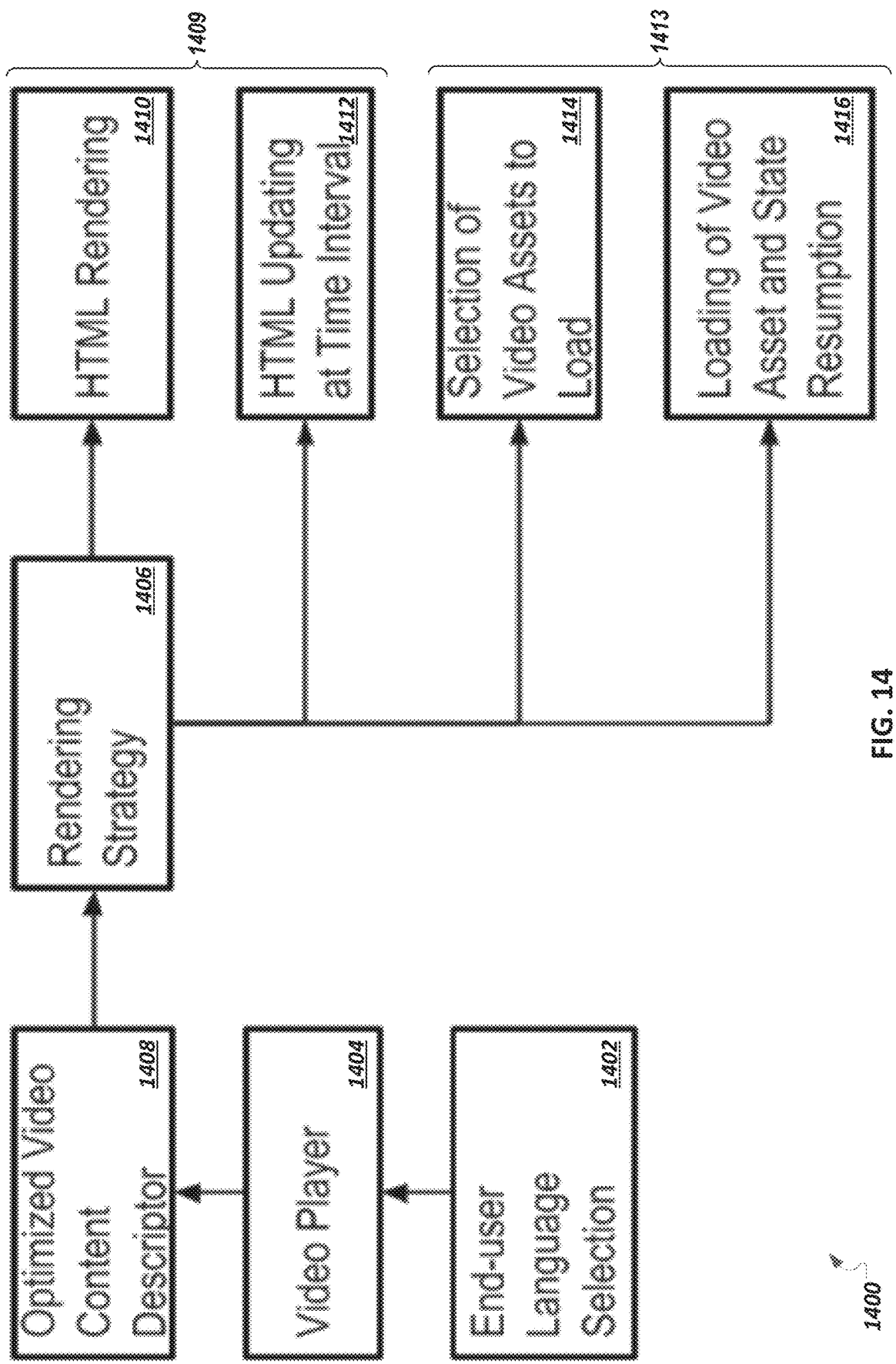
FIG. 14 illustrates an example system for enabling various rendering strategies.

FIG. 14 illustrates an example system 1400 for enabling various rendering strategies. After a user performs language selection 1402 in a language-dynamic video player 1404, a rendering strategy 1406 can be used to render translated assets based on information in an optimized video content descriptor 1408.

For example, different rendering strategies 1406 may be utilized by the video player 1404 to effect a change in content. Rendering strategies 1406 can include rendering HTML overlays, loading different video assets, or other strategies. For example, a first strategy 1409 can include HTML rendering 1410. For instance, HTML5 code (or another type of code) can be programmatically generated and rendered to overlay bounding boxes atop the video player 1404 based on the optimized video content descriptor 1408. The first rendering strategy 1409 can include HTML updating at time intervals 1412. For instance, properties of the overlays may be updated as the time offset of the video changes and/or based on an interpolation of the current time and framerate of the video, in accordance with the timecode offsets specified in the optimized video content descriptor 1408 for each element.

A second strategy 1413 can include selection of video assets to load 1414 and loading of video asset and state resumption 1416 (e.g., resuming video playback using the loaded video asset). For example, the second strategy 1413 can include selecting, from the optimized video content descriptor 1408, a video asset source location for a translated video with a matching language code, and replacing the current video asset with the translated video. In the second strategy 1413, the video asset source may be a URI (Uniform Resource Identifier) to a video file or to a video streaming technology such as a M3U8 (Moving Picture Experts Group Audio Layer 3 Uniform Resource Locator) format, or a HLS (HTTP Live Streaming) format. In the case of a video file, a request for the file can be made with byte-range headers calculated to request the resource to start at a particular time offset. Upon loading the file, the video player can queue the video to the timecode offset. In the case of M3U8 technology being used, methods can be invoked to ensure a TS (Transport Stream) file closest to the timecode offset is selected for initial loading. Regardless of format, replacing or augmenting the video can be performed so as to be imperceptible, or nearly so, to an end-user.

The video player 1404 may collect usage metrics concerning, for example, the preferred language selected by the end-user, the language that is loaded by the player, or the duration of time to execute each step in the rendering strategy 1406. As other examples, metrics regarding end user device, software environment, network information, location information, and previous viewing sessions may be used in methods to refine the rendering strategy's selection of content (e.g., video assets) to load. For example, given that an end-user is located in a country which requires video assets to have a network origin within that country, and that video content descriptor metadata indicates that video assets are available within that country, the content selection strategy 226 can use the location information as selection criteria of a video asset.

Figure 15:
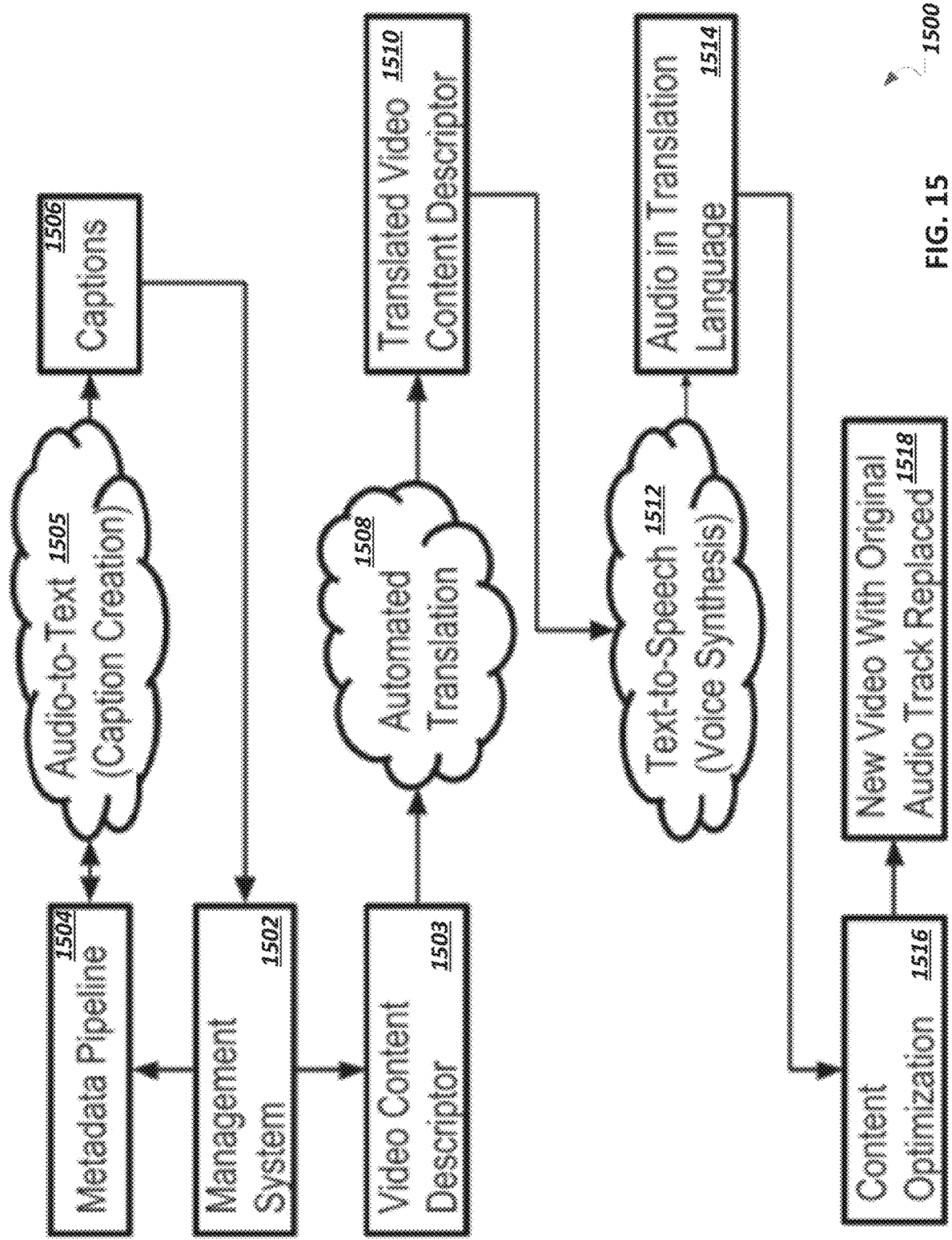
FIG. 15 illustrates an example system for creating audio content.

FIG. 15 illustrates an example system 1500 for creating audio content. A management system 1502 can use various technologies to automatically create dubbed-audio content, in a language other than the one spoken in the original audio, based on the original audio and a video content descriptor 1503 created by a metadata pipeline 1504 (such as the metadata creation pipeline 210 or metadata creation pipeline 301). For example, the metadata pipeline 1504 can use an audio-to-text engine 1505 to generate text data 1506 (e.g., captions) from the audio of the original video. The text data 1506 can be stored by the management system 1502 in the video content descriptor 1503.

An automated translation engine 1508 can create a translated video content descriptor 1510, from the video content descriptor 1503, that includes translated versions of the text data 1506 that have been translated to a target language. A text-to-speech (e.g., voice synthesis) engine 1512 can generate new audio data 1514 in the target language. A content optimization engine 1516 can generate new video asset(s) 1518 that incorporate replacement of the original audio track with the new audio data 1514.

Figure 16:
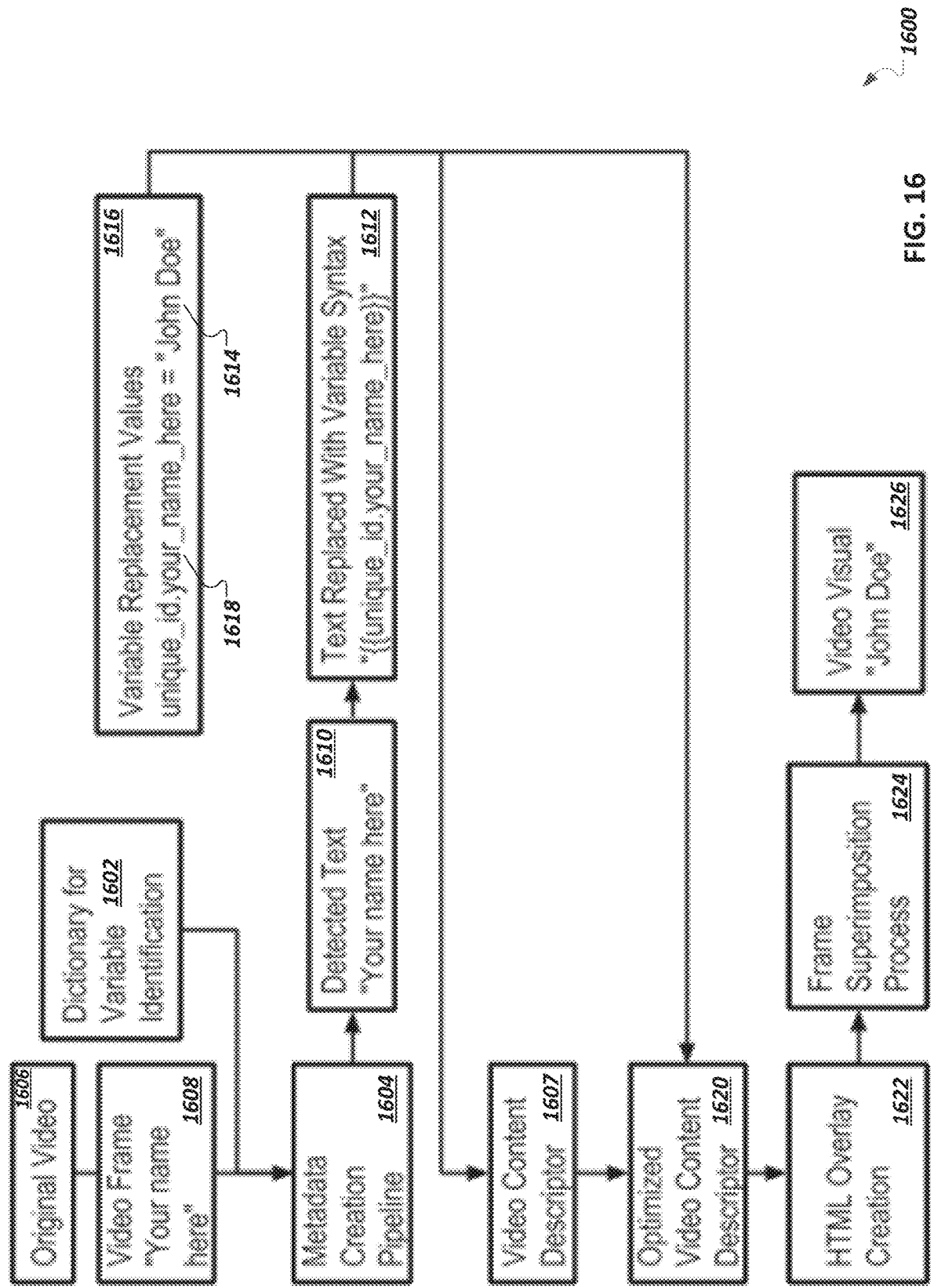
FIG. 16 illustrates an example system for replacing detected text.

FIG. 16 illustrates an example system 1600 for replacing detected text in a video. The system can be used for purposes other than translation. For example, the system may be utilized to replace detected text values with other content that is not a translation of the detected text. For instance, the system may be configured to replace specific text, as specified in a dictionary 1602 used by a metadata creation pipeline 1604. For example, the dictionary 1602 can include an entry that maps an original value of "Your name here" with a predefined variable text value such as "{{unique_id.your_name}}." The predefined variable text value can serve as an element that has a special syntax and a unique identifier assigned by the system.

An original video 1606 can include at least one frame 1608 that includes the original value of "Your name here". Accordingly, a video content descriptor 1607 can include a metadata entry with the text "Your name here." The metadata creation pipeline 1604 can identify the original value in the video content descriptor 1607 as detected text 1610. Detected text processing can include replacement 1612 of the detected text 1610 with the predefined variable text of "{{unique_id.your_name}}."

The predefined variable text value can be used to indicate to the system that the text is variable and is targeted for replacement again at a later stage. For example, the metadata creation pipeline 1604 can, at runtime, such as by using a dynamic-language video player or underlying APIs, obtain an input value to resolve the variable text. For instance, the metadata creation pipeline 1604 can obtain an input 1614 of "John Doe" and in a mapping process 1616 map the "John Doe" input 1614 to the variable replacement text 1618. A variable replacement process can include replacing the variable replacement text 1618 with the input 1614 as part of generating an optimized video content descriptor 1620. In a rendering process that can include overlay creation 1622 and a frame superimposition process 1624, a video visual 1626 that includes the "John Doe" input can appear in a video presented to the user in a video player.

As another example, the invention can be used to replace detected objects and fiducials with text or image content, or to remove or blur the detected content. A dictionary of terms, objects, or fiducials to detect and replace, along with associated replacement values may be provided by a third party system, such as an advertising server or network or other type of system. Further, replacement of objects or fiducials may be combined with a "dubbed-audio" configuration in order to selectively replace spoken content in the audio track with separate "dubbed" audio content.

Another non-translation use of the system can be to replace sections of text in the video which are present for legal, regulatory or institutional compliance. For example, a video promoting a product which is regulated by the FDA (Food and Drug Administration) may contain important safety information text. The important safety information text may be identified using any combination of techniques described for the metadata pipeline and normalization process. The user of the system may provide replacement values for the detected text and utilize the video optimization process in order to create new video containing the replacement values.

Figure 17:
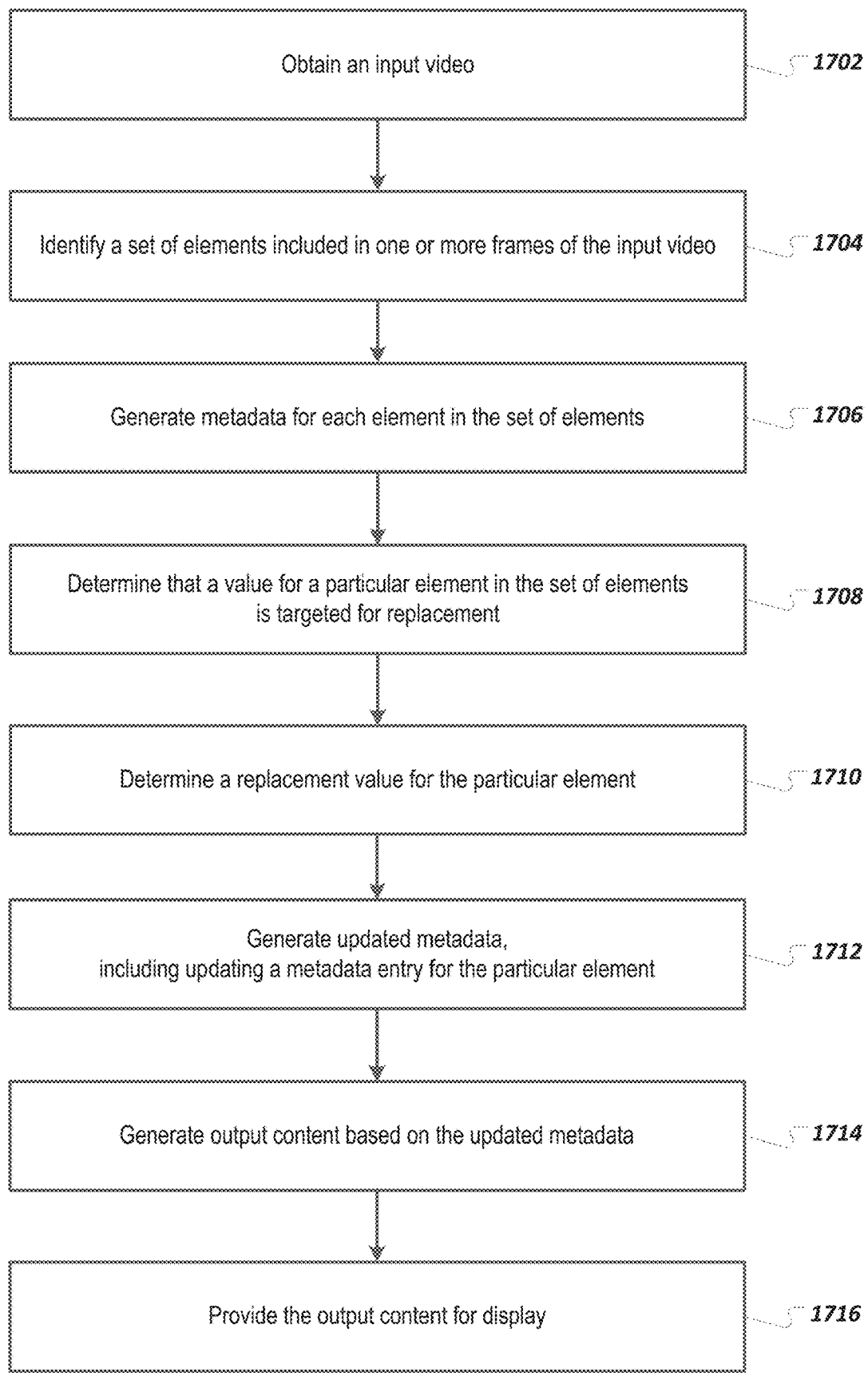
FIG. 17 is a flowchart of an example method for automatically replacing values in video content.

FIG. 17 is a flowchart of an example method 1700 for automatically replacing values in video content. It will be understood that method 1700 and related methods may be performed, for example, by any suitable system, environment, software, and hardware, or a combination of systems, environments, software, and hardware, as appropriate. In some implementations, the method 1700 is executed by one or more components of the system 100 described above with respect to FIG. 1 (and/or as further described with reference to FIGS. 2-16). For example, the method 1700 can be executed by the video processing engine 114, the local video processing engine 116, or the local video processing engine 122 of FIG. 1.

At 1702, an input video is obtained. For example, a user can select an input video or provide the input video or a reference to the input video to a management system, which in turn obtains the input video. For example, as described with reference to FIG. 2, the management system 201 can obtain the original video 204. In some implementations, the input video is pre-processed. Preprocessing the input video can include, e.g., inserting duplicate frames into the input video or splitting the input video into multiple video portions.

At 1704, elements included in one or more frames of the input video are identified. The identified elements can include one or more of text elements, object elements, and spoken utterances. For example, as described with reference to FIG. 3, the audio-to-text process 310 can detect spoken words in audio associated with the input video, the visual-text detection process 312 can detect text in the input video, and the visual object and fiducial detection process 314 can detect objects in the input video.

At 1706, metadata is generated for each element in the set of elements. For example, as described with reference to FIG. 3, the metadata creation pipeline can generate metadata for identified elements. Metadata can be stored in (or represented as) a video content descriptor, such as the video content descriptor 318. For text elements and object elements, generated metadata can include token values, frame information, time offset information, and positional information corresponding to the identified elements. For spoken utterances, generating metadata for the identified elements can include determining time offsets of the spoken utterances, generating a token value for each spoken utterance, and performing a speech to text conversion of the spoken utterances to generate text corresponding to the spoken utterances.

At 1708, a determination is made that a value for a particular element in the set of elements is targeted for replacement. For example, with reference to FIG. 1, the video processing engine 114 can determine that an element is targeted for replacement based on a video processing request. For example, determining that a value for the particular element is targeted for replacement can include receiving a request to translate the input video into a target language that is different from a source language of the particular element. The request to translate the input video can identify the source language of the particular element. As another example, the source language of the particular element can be automatically determined.

In some implementations, as described with reference to FIG. 15, determining that a value for a particular element in the set of elements is targeted for replacement can include determining that the particular element is included in a dictionary (e.g., the dictionary 1602) that maps original values to replacement values. For example, the dictionary 1602 can map the input 1614 "John Doe" to the variable replacement text 1618 "unique_id.your_name_here" As another example, determining that a value for a particular element in the set of elements is targeted for replacement can include determining that at the particular element includes an object element that is targeted for replacement with a corresponding text element.

At 1710, a replacement values is determined for the particular element. For example, with reference to FIG. 1, the replacement value identifier 140 can identify the replacement value. Determining the replacement value for the particular element can include translating a text value into the target language. When the particular element is included in a dictionary that maps original values of elements to replacement values of the elements, determining the replacement value can include querying the dictionary for a corresponding replacement value the value of the particular element. When the particular element is an object element, determining the replacement value can include identifying a corresponding replacement text value for the object element.

At 1712, updated metadata is generated. For example, a metadata entry for the particular element can be updated to include a corresponding replacement value. For example, with reference to FIG. 11, input video content descriptor data 1112 can be converted into output video content descriptor data 1114. Updating the metadata entry can include adding a translated text value to the metadata entry. In some implementations, generating updated metadata can include normalizing the metadata entry. Normalizing the metadata entry can include modifying the metadata entry so that the metadata entry is consistent, with respect to units, labels, or other attributes included in other metadata entries. In some implementations, generating updated metadata can include modifying the metadata entry to include rendering code that can be used to display the value. For example, a text value that is determined to be a URL can be modified to include link markup tag(s) so that when rendered the text value appears as a selectable link.

Generating updated metadata can include splitting a single metadata entry into multiple metadata entries or combining multiple metadata entries into a single metadata entry. In some implementations, generating updated metadata can include presenting a visual representation of the particular element in a user interface, enabling the user to interact with the visual representation, and updating the metadata entry in response to user interactions with the visual representation. For example, the user can move, merge, split, or edit the visual representation.

At 1714, output content is generated based on the updated metadata. For example, one or more new video assets, such as the new video resources 1216 described above with respect to FIG. 12, can be created that include the identified replacement values. As another example, overlay content (e.g., the overlay content 146 described above with respect to FIG. 1) that includes replacement values can be generated in preparation for superimposing the overlay content on top of original values in the input video.

At 1716, the output content is provided for display. For example, when new video assets are created, the new video assets can be presented to a user, as described above for FIG. 14 with respect to the second rendering strategy. As another example, when overlay content is generated, the overlay content can be rendered in a video player over original values as corresponding frames are being presented during playback of the input video, as described above for FIG. 14 with respect to the first rendering strategy. Other types of output can be generated and provided. For example, one or both of the metadata or the updated metadata can be provided. As another example, non-video assets can be generated and provided, such as updated (e.g., translated) closed captioning resources.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining an input video;
   identifying a set of video elements included in one or more frames of the input video;
   generating metadata for each video element in the set of video elements;
   determining that a value for a particular video element in the set of video elements is targeted for replacement, wherein the particular video element includes text related to regulatory compliance to a regulation;
   determining a replacement value for the particular video element, comprising determining that the regulation specifies replacement of the text related to regulatory compliance, wherein the replacement value for the particular video element comprises replacement text specified by the regulation;
   generating updated metadata, including updating a metadata entry in the generated metadata for the particular video element to include the determined replacement value for the particular video element;
   generating output content based on the updated metadata, wherein the output content includes the determined replacement value for the particular video element; and
   providing the output content for display.

2. The computer-implemented method of claim 1, wherein:
the identified set of video elements include one or more of text elements, object elements, or spoken utterances; and
determining that the value for the particular video element that is targeted for replacement comprises receiving a request to translate the input video into a target language that is different from a source language of the particular video element.

3. The computer-implemented method of claim 2, wherein the request to translate the input video identifies the source language of the particular video element.

4. The computer-implemented method of claim 2, further comprising determining the source language of the input video.

5. The computer-implemented method of claim 2, wherein determining the replacement value for the particular video element comprises translating a text value of the particular video element into the target language.

6. The computer-implemented method of claim 5, wherein updating the metadata entry for the particular video element comprises adding translated text values to the corresponding metadata entry for the particular video element.

7. The computer-implemented method of claim 1, wherein generating the output content based on the updated metadata comprises creating a new video asset that includes the determined replacement value.

8. The computer-implemented method of claim 1, wherein providing the output content for display comprises rendering a replacement value as overlay content superimposed over the value of the particular video element as one or more frames of the input video that include the particular video element are being presented during playback of the input video.

9. The computer-implemented method of claim 1, wherein the identified set of video elements comprises text elements and object elements and wherein generating metadata for each video element in the set of video elements comprises generating, for each video element in the set of video elements, a token value, frame information, time offset information, and positional information.

10. The computer-implemented method of claim 1, wherein generating updated metadata comprises splitting a single metadata entry into multiple metadata entries or combining multiple metadata entries into a single metadata entry.

11. The computer-implemented method of claim 1, wherein generating updated metadata comprises:
providing visual representations of the identified video elements for display in a user interface;
enabling a user to interact with the visual representations; and
updating the metadata in response to user interactions with the visual representations.

12. The method of claim 1 wherein generating updated metadata comprises modifying metadata entries to include rendering code for use in rendering the replacement value as overlay content over the value of the particular video element.

13. The method of claim 1, wherein:
determining that the particular video element is targeted for replacement comprises determining that the particular video element is included in a dictionary that maps original values to replacement values; and
determining the replacement value for the particular video element comprises querying the dictionary to obtain the replacement value.

14. The method of claim 1, wherein:
the particular video element is a legal disclaimer text; and
the replacement value for the particular video element is determined in response to determining that the regulation requires replacement of the legal disclaimer text.

15. The computer-implemented method of claim 1, wherein generating updated metadata comprises combining multiple metadata entries into a single metadata entry, wherein each of the multiple metadata entries is metadata for a particular text item delineated by a bounding box and the single metadata entry represents the metadata for a combination of two or more text items represented by respective bounding boxes into a combined bounding box for the two or more text items.

16. A system comprising:
one or more processors; and
one or more memory elements including instructions that when executed cause the one or more processors to:
obtain an input video;
identify a set of video elements included in one or more frames of the input video;
generate metadata for each video element in the set of video elements;
determine that a value for a particular video element in the set of video elements is targeted for replacement, wherein the particular video element includes text related to regulatory compliance to a regulation;
determine a replacement value for the particular video element, comprising determining that the regulation specifies replacement of the text related to regulatory compliance, wherein the replacement value for the particular video element comprises replacement text specified by the regulation;
generate updated metadata, including updating a metadata entry in the generated metadata for the particular video element to include the determined replacement value for the particular video element;
generate output content based on the updated metadata, wherein the output content includes the determined replacement value for the particular video element; and
provide the output content for display.

17. The system of claim 16, wherein:
the identified set of video elements include one or more of text elements, object elements, or spoken utterances; and
determining that the value for the particular video element that is targeted for replacement comprises receiving a request to translate the input video into a target language that is different from a source language of the particular video element.

18. The system of claim 17, wherein determining the replacement value for the particular video element comprises translating a text value of the particular video element into the target language.

19. The system of claim 17, wherein updating the metadata entry for the particular video element comprises adding translated text values to the corresponding metadata entry for the particular video element.

20. The system of claim 16, wherein generating the output content based on the updated metadata comprises creating a new video asset that includes the determined replacement value.

21. The system of claim 16, wherein providing the output content for display comprises rendering a replacement value as overlay content superimposed over the value of the particular video element as one or more frames of the input video that include the particular video element is being presented during playback of the input video.

22. A non-transitory, computer-readable medium storing computer-readable instructions executable by a computer and configured to:

obtain an input video;

identify a set of video elements included in one or more frames of the input video;

generate metadata for each video element in the set of video elements;

determine that a value for a particular video element in the set of video elements is targeted for replacement, wherein the particular video element includes text related to regulatory compliance to a regulation;

determine a replacement value for the particular video element, comprising determining that the regulation specifies replacement of the text related to regulatory compliance, wherein the replacement value for the particular video element comprises replacement text specified by the regulation;

generate updated metadata, including updating a metadata entry in the generated metadata for the particular video element to include the determined replacement value for the particular video element;

generate output content based on the updated metadata, wherein the output content includes the determined replacement value for the particular video element; and provide the output content for display.

* * * * *